United States Patent
Ruoppila

(10) Patent No.: US 10,269,360 B2
(45) Date of Patent: Apr. 23, 2019

(54) EFFICIENT FORMAT CONVERSION IN AUDIO CODING

(71) Applicant: Dolby International AB, Amsterdam, Zuidoost (NL)

(72) Inventor: Vesa Ruoppila, Nuremberg (DE)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 16/075,098

(22) PCT Filed: Feb. 3, 2017

(86) PCT No.: PCT/EP2017/052364
§ 371 (c)(1),
(2) Date: Aug. 2, 2018

(87) PCT Pub. No.: WO2017/134214
PCT Pub. Date: Aug. 10, 2017

(65) Prior Publication Data
US 2019/0013029 A1    Jan. 10, 2019

Related U.S. Application Data

(60) Provisional application No. 62/290,930, filed on Feb. 3, 2016, provisional application No. 62/290,924, filed
(Continued)

(30) Foreign Application Priority Data

Apr. 22, 2016   (EP) ..................................... 16166649
Apr. 22, 2016   (EP) ..................................... 16166650
(Continued)

(51) Int. Cl.
*H04R 5/00*   (2006.01)
*G10L 19/00*   (2013.01)
(Continued)

(52) U.S. Cl.
CPC ............ *G10L 19/008* (2013.01); *H04S 3/008* (2013.01); *G06F 17/16* (2013.01); *H04S 2400/01* (2013.01); *H04S 2400/03* (2013.01)

(58) Field of Classification Search
CPC ........ H04R 3/00; H04R 3/04; H04R 2430/03; G10L 19/00; G10L 19/008;
(Continued)

(56) References Cited

U.S. PATENT DOCUMENTS 6,005,948 A * 12/1999 Maeda ...................... H04S 3/02
                                                                  381/119
7,626,889 B2 * 12/2009 Seltzer ...................... G01S 3/86
                                                                  367/125
(Continued)

OTHER PUBLICATIONS

ISO/IEC JTC 1/SC29 Information Technology—High Efficiency Coding and Media Delivery in Heterogenous Environments—Part 3:3D Audio: Amendment 3: MPEG-H 3D Audio Phase 2, Nov. 16, 2015.
(Continued)

*Primary Examiner* — Thang V Tran

(57) ABSTRACT

The present disclosure relates to a method of downmixing a plurality of input audio channels. The method include obtaining, for each of the input audio channels, a plurality of frequency coefficients in a plurality of corresponding frequency bins, and applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin. The method further involves determining a third array including only the non-zero entries of the downmix matrix, and determining a fourth array including, for each entry of the third array, an entry indicative of a position of the respective entry of the
(Continued)

third array within the downmix matrix. Applying the downmix matrix to the first array involves multiplying, for the at least one frequency bin, the entries of the third array with corresponding entries of the first array for the respective frequency bin, the corresponding entries of said first array being determined on the basis of the fourth array. The present disclosure further relates to a corresponding apparatus for downmixing a plurality of input audio channels and to a corresponding program storage device configured for downmixing a plurality of input audio channels.

25 Claims, 7 Drawing Sheets

Related U.S. Application Data on Feb. 3, 2016, provisional application No. 62/290,934, filed on Feb. 3, 2016, provisional application No. 62/290,913, filed on Feb. 3, 2016, provisional application No. 62/290,915, filed on Feb. 3, 2016.

(30) Foreign Application Priority Data

| Apr. 22, 2016 | (EP) | 16166651 |
|---|---|---|
| Apr. 22, 2016 | (EP) | 16166652 |
| Apr. 22, 2016 | (EP) | 16166653 |

(51) Int. Cl.
*H04S 3/00* (2006.01)
*G06F 17/16* (2006.01)
*G10L 19/008* (2013.01)

(58) Field of Classification Search
CPC . G10L 19/0204; G10L 21/0272; G10L 25/18; H04S 2400/00; H04S 2400/01; H04S 2400/03; H04S 3/002; H04S 3/006; H04S 3/008; H04S 2420/07; G06F 17/10; G06F 17/16
See application file for complete search history.

(56) References Cited

U.S. PATENT DOCUMENTS

| 9,418,048 | B2* | 8/2016 | Usui | G06F 17/16 |
|---|---|---|---|---|
| 9,715,880 | B2* | 7/2017 | Friedrich | G10L 19/008 |
| 9,734,833 | B2* | 8/2017 | Disch | G10L 19/025 |
| 2008/0052089 | A1* | 2/2008 | Takagi | G10L 19/008 704/503 |
| 2014/0298351 | A1 | 10/2014 | Usui | |
| 2018/0012607 | A1* | 1/2018 | Setiawan | G10L 19/008 |
| 2018/0061425 | A1* | 3/2018 | Setiawan | G10L 19/008 |
| 2018/0308507 | A1* | 10/2018 | Shuang | H04R 3/04 |

OTHER PUBLICATIONS

Williams, S. et al "Optimization of Sparse Matrix-Vector Multiplication on Emerging Multicore Platforms" IEEE Conference on Supercomputing, Nov. 2007, pp. 1-12.

Kuntz, Achim, et al "CE on Low Complexity downmix" MPEG Meeting Oct. 19-23, 2015, Motion Picture Expert Group.

* cited by examiner $$M_{DMX} = \begin{pmatrix} 1 & 0 & 0 & 4 & 0 & 0 \\ 0 & 2 & 0 & 0 & 0 & 6 \\ 0 & 0 & 3 & 0 & 5 & 0 \end{pmatrix} \longrightarrow M = [1, 4, 2, 6, 3, 5]$$

$s = [1, 4, 2, 6, 3, 5]$ $r = [2, 2, 2]$

EFFICIENT FORMAT CONVERSION IN AUDIO CODING

TECHNICAL FIELD

The present document relates to methods and apparatus for format conversion (including downmixing) of audio signals. In particular, the present document relates to methods and apparatus for simplified and more efficient format conversion, for example, in the context of the MPEG-H 3D Audio standard.

BACKGROUND

The format converter of the Main Profile of the MPEG-H 3D Audio standard is a downmixer that converts multichannel audio signals from transmitted channel configurations with $N_{in}$ channels to desired reproduction formats with $N_{out} \leq N_{in}$ channels. This downmixer features a phase-alignment active downmix algorithm that ensures energy preservation and moreover serves to prevent or reduce uncontrolled signal cancellations or signal amplifications that would otherwise result in unwanted signal coloration and artefacts. On the downside, the downmix algorithm has high computational complexity and imparts high computational load on the decoder. For example, for a downmix from 22.2 channels to stereo, about 50 percent of the full decoder complexity in the Main Profile are allotted to the downmix algorithm.

High computational complexity foremost arises for a large number $N_{in}$ of input channels. Computational load is especially critical for devices that typically have comparably small computation power, but render high-quality broadcasting content characterized by a large number of channels.

Thus, there is a need for a simple and efficient format converter that still maintains the advantageous properties with regard to audio signal quality and energy preservation.

SUMMARY

According to an aspect of the disclosure, a method of downmixing a plurality of input audio channels is described. The method may include obtaining, for each of the input audio channels, a plurality of frequency coefficients in a plurality of corresponding frequency bins (transform domain frequency bins). The obtaining step may relate to receiving the frequency coefficients from a bitstream, or to applying a time-frequency transform to each of the input audio channels to obtain (for each of the input audio channels) the plurality of frequency coefficients in the plurality of corresponding frequency bins. The time-frequency transform may be a Short Time Fourier Transform (STFT). In particular, the time-frequency transform may be a Discrete Fourier Transform (DFT), (e.g. a Fast Fourier Transform (FFT)). The method may further include applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin. The first and second arrays may be linear arrays (vectors). The number of entries (elements) of the first array may be given by the number of input audio channels, and the number of entries of the second array may be given by the number of output audio channels. The downmix matrix may be different for different frequency bins, or may be different for different audio bands (processing bands). In embodiments, the downmix matrix may be uniform across the frequency bins or audio bands. The method may further involve determining a third array including only the non-zero entries (elements) of the downmix matrix. The method may further involve determining a fourth array including, for each entry of the third array, an entry indicative of a position of the respective entry of the third array within the downmix matrix. Applying the downmix matrix to the first array may involve multiplying, for the at least one frequency bin, the entries of the third array with corresponding entries of the first array for the respective frequency bin, the corresponding entries of said first array being determined on the basis of the fourth array. Therein, corresponding entries within the first array are understood to indicate entries that would be multiplied with respective non-zero entries of the downmix matrix in usual matrix multiplication of the downmix matrix and the first array. Applying the downmix matrix may further involve appropriate summation of the obtained products and assigning sums of (one or more) of the obtained products to entries of the second array.

Configured as above, as known to those skilled in the art, the proposed method exploits the fact that in usual application scenarios, especially when the number of channels is large (e.g. $N_{in}$, $N_{out} \geq 6$), the downmix matrices typically are sparse matrices, since typically not all output channels depend on all input channels. In other words, in usual application scenarios, the downmix matrix will have entries that are equal to zero. The sparsity of the downmix matrix, that is, the proportion of the zero entries, depends on the use case of format conversion. Typically however, the sparsity increases with the increasing number of input and output channels. For example, for a practical use case for downmixing 22.2 channel audio to 5.1 channel audio, in which the downmixing matrix has 34 non-zero entries among the 144 entries in the 6×24 downmix matrix, the sparsity S would be given by $$S = \frac{144 - 34}{144} \approx 76\%.$$

By exploiting sparsity, the computational complexity of format converting one audio band can be reduced approximately from $\mathcal{O}(N_{out}N_{in}^2)$ down to $\mathcal{O}((1-S)N_{out}N_{in}^2)$, possibly with some additional overhead depending on, for example, the hardware platform and the exact representation employed for sparse downmix matrices.

In particular, the proposed method minimizes accesses to the downmix matrix and avoids computation steps that add to the overall computation cost but would not affect the desired result of the computation. Accordingly, the overall computation of downmixed audio channels can be performed in a more efficient manner with regard to both computational cost and memory access rate, without deteriorating accuracy of the computation, for example without affecting the result of the computation. Therefore, a format converter of an audio decoder employing the proposed method may have reduced computational capabilities which allows for a slim design of the format converter.

While the proposed method is beneficial for any case of a sparse downmix matrix, it is particularly beneficial for reducing the worst case complexity that occurs for the maximum number of input channels and output channels supported by the system. Generally speaking, the proposed method is particularly beneficial for complex use cases involving a large number of input and output channels.

In the above and in the remainder of this section, the proposed method is stated to be performed for at least one frequency bin. It is however understood that the method may be performed for a single frequency bin, for all frequency bins within a group of frequency bins (e.g. within a given audio band (processing band)), or for all frequency bins (e.g., for each frequency bin) of the time-frequency transform.

In some example embodiments, the method may further include the step of determining (calculating), for the at least one frequency bin, for each intermediate audio channel, an indication of energy of the respective intermediate audio channel. The method may yet further include the step of adjusting, for the at least one frequency bin, for each intermediate audio channel, a magnitude of the frequency coefficient of the respective intermediate audio channel in the respective frequency bin on the basis of the respective indication of energy.

In some example embodiments, the method may further involve a determination of whether the downmix matrix is a sparse matrix. Then, the processing involving the third and fourth arrays (and also a fifth array defined below) may be performed only if it is found that the downmix matrix is a sparse matrix.

In some example embodiments, determining said indication of energy may involve, for the at least one frequency bin, multiplying powers of the entries of the third array with powers of the absolute values of the corresponding entries of the first array, the corresponding entries of the first array being determined on the basis of the fourth array. For example, the indication of energy may involve multiplying the squares of the entries of the third array with the squares of absolute values (absolute squares) of the corresponding entries of the first array. Determining the indication of energy may further involve appropriate summation of the obtained products. Said indication of energy may be identical for all frequency bins within a given audio band. In such case, determining said indication of energy for a frequency bin may further involve summing up of respective results (e.g. appropriate sums of the obtained products) that have been obtained for each of the frequency bins within the given audio band.

This enables to efficiently calculate the indication of energy in a particularly simple manner with regard to computational cost and memory access rate. Moreover, implementing the determination of the indication of energy in this way, both the calculation of the intermediate audio channels and the calculation of the indication of energy can be jointly performed. This joint calculation enables to use the same calculation tools for both calculations and to avoid repeated looping over indices of the first and third arrays and thus can further reduce computational complexity and memory access rate.

In some example embodiments, the third array may be a linear array (vector) including the non-zero entries of the downmix matrix in their order of occurrence in a predetermined scan order across the entries of the downmix matrix. The scan order may be a row-wise scan order or a column-wise scan order, for example.

In some example embodiments, each entry of the fourth array may be indicative of the position of the respective entry of the third array within the downmix matrix in the scan order. The position may be a linear position. Moreover, the position may be an absolute position in the scan order, for example the absolute position modulo (mod) the row length for row-wise scan order or modulo the column length (column height) for column wise scan order.

In some example embodiments, each entry of the fourth array may indicate, for a row-wise scan order, the column of the downmix matrix in which the respective entry of the third array is located in the downmix matrix. For a column-wise scan order, each entry of the fourth array may indicate the row of the downmix matrix in which the respective entry of the third array is located in the downmix matrix.

In alternative embodiments, each entry of the fourth array may indicate an offset of the position of the respective entry of the third array within the downmix matrix in the scan order from a first position in the scan order. In further alternative embodiments, each entry of the fourth array may indicate an offset of the position of the respective entry of the third array within the downmix matrix in the scan order from a position of a preceding entry of the respective entry of the third array within the downmix matrix in the scan order.

Providing such indications of position in a fourth array allows to readily infer corresponding entries in the first array to a given entry of the third array with little computational effort and with reduced memory access rate.

In some example embodiments, the method may further include the step(s) of determining a fifth array. The entries of the fifth array may indicate the number of non-zero entries per respective row of the downmix matrix for a row-wise scan order or the number of non-zero entries per respective column of the downmix matrix for a column-wise scan order. Therein, the entries of the fifth array may have the same order as the rows or columns of the downmix matrix have in the downmix matrix, from first to last.

In some example embodiments, applying the downmix matrix to the first array may further involve, for the at least one frequency bin, assigning sums of one or more products of the entries of the third array with the corresponding entries of the first array for the respective frequency bin to the entries of the second array on the basis of the entries of the fifth array.

In some example embodiments, applying the downmix matrix to the first array may further involve, for the at least one frequency bin, successively incrementing an entry index to the third array by one at a time and determining (calculating), for each such entry index, a product of the entry of the third array indicated by the respective entry index with the corresponding entry of the first array for the respective frequency bin. Applying the downmix matrix to the first array may yet further involve, for the at least one frequency bin, sequentially assigning sums of one or more of these products to the entries of the second array, wherein the assignment is based on the entries of the fifth array. Therein, said incrementing may be started from the lowest possible value for the entry index (e.g. from 1).

In some example embodiments, applying the downmix matrix to the first array may further involve, for the at least one frequency bin and for each entry index to the third array, determining, as a second product, a product of the square of the entry of the third array indicated by the respective entry index with the absolute square of the corresponding entry of the first array for the respective frequency bin. Applying the downmix matrix to the first array may yet further involve, for the at least one frequency bin and for each entry index to the third array, sequentially assigning sums of one or more of these second products to the entries of a sixth array for the respective frequency bin. The assignment may be based on the entries of the fifth array. A sum of the sixth arrays over frequency bins within a given processing band may yield the first indication of energy for the frequency bins within the given processing band.

In some example embodiments, the step of determining the frequency bins within the given processing band may involve referring to a lookup table. The lookup table may include, for each processing band, an entry indicating the number of frequency bins within the respective processing band.

In some example embodiments, the method may further involve, for the first entry of the second array, determining the number of non-zero entries in the first row of the downmix matrix from the first entry of the fifth array. An entry index to the second and fifth arrays may be initialized to 1. The method may further include determining (calculating), as a first product, the product of the first entry of the third array with an entry of the first array indicated by the first entry of the fourth array. The method may further include determining (calculating), as a second product, the product of the square of the first entry of the third array with the absolute square of an entry of the first array indicated by the first entry of the fourth array. The method may further include, if the number of determined first products is less than the number of non-zero entries in the first row of the downmix matrix, incrementing the entry index to the third array and the entry index to the fourth array by one and determining (calculating), as a first product, the product of the entries of the third array and the fourth array indicated by respective incremented entry indices. The method may yet further include summing the determined first products and assigning the sum of the determined first products to the first entry of the second array. The method may yet further include summing the determined second products and assigning the sum of the determined second products to the first entry of the sixth array. Subsequently, the entry indices to the third, fourth and fifth arrays may be incremented each by one and the aforementioned steps may be repeated for the second entry of the second array and the second entry of the sixth array, and so forth, until the last entry of the second array (and the sixth array) is reached.

It should be noted that the methods described in the present document may be applied to corresponding apparatus, for example format converters or audio decoders. Any statements made above with respect to methods are understood to likewise apply to apparatus for downmixing a plurality of input audio channels.

Consequently, according to another aspect, an apparatus for downmixing a plurality of input audio channels is described. The apparatus (e.g. format converter or audio decoder) may include a frequency coefficient obtaining unit adapted (configured) to obtain, for each of the input audio channels, a plurality of frequency coefficients in a plurality of corresponding frequency bins (transform domain frequency bins). The frequency coefficient obtaining unit may be a receiving unit adapted to receive said frequency coefficients from a bitstream, or a time-frequency transform unit adapted to apply a time-frequency transform to each of the input audio channels to obtain, for each of the input audio channels, the plurality of frequency coefficients in the plurality of corresponding frequency bins. The time-frequency transform may be, for example, a Short Time Fourier Transform (STFT). In particular, the time-frequency transform may be a Discrete Fourier Transform (DFT), e.g. a Fast Fourier Transform (FFT). The apparatus may further include a downmix matrix obtaining unit adapted to obtaining a downmix matrix. The apparatus may further comprise a downmixing unit adapted to apply, for at least one frequency bin, the downmix matrix to a first array formed by the frequency coefficients of the plurality of input audio channels for the respective frequency bin to obtain a second array formed by the frequency coefficients of a plurality of intermediate audio channels for the respective frequency bin. The first and second arrays may be linear arrays (vectors). The number of entries (elements) of the first array may be given by the number of input audio channels, and the number of entries of the second array may be given by the number of output audio channels. The downmix matrix may be different for different frequency bins, or may be different for different audio bands (processing bands).

In some example embodiments, the downmix matrix may be uniform across the frequency bins or audio bands. The downmixing unit may be adapted to determine a third array including only the non-zero entries of the downmix matrix. The downmixing unit may be further adapted to determine a fourth array including, for each entry of the third array, an entry indicative of a position of the respective entry of the third array in the downmix matrix. The downmixing unit may be yet further adapted to multiply, for the at least one frequency bin, the entries of the third array with corresponding entries of the first array for the respective frequency bin, the corresponding entries of the first array being determined on the basis of the fourth array. Therein, corresponding entries in the first array are understood to indicate entries that would be multiplied with respective non-zero entries of the downmix matrix in usual matrix multiplication of the downmix matrix and the first array. The downmix unit may be further adapted to perform appropriate summation of the obtained products and assign sums of (one or more) of the obtained products to entries of the second array.

In some example embodiments, the apparatus may further include an energy determination unit adapted to determine, for the at least one frequency bin, for each intermediate audio channel, an indication of energy of the respective intermediate audio channel. The apparatus may yet further include an adjusting unit adapted to adjust, for the at least one frequency bin, for each intermediate audio channel, a magnitude of the frequency coefficient of the respective intermediate audio channel in the respective frequency bin on the basis of the respective indication of energy.

In some example embodiments, the downmixing unit may be further adapted to determine whether the downmix matrix is a sparse matrix. Then, the processing involving the third and fourth arrays (and also a fifth array defined below) may be performed only if it is found that the downmix matrix is a sparse matrix.

In some example embodiments, the third array may be a linear array including the non-zero entries of the downmix matrix in their order of occurrence in a predetermined scan order across the entries of the downmix matrix.

In some example embodiments, the downmixing unit may be further adapted to determine a fifth array. The entries of the fifth array may indicate the number of non-zero entries per respective row of the downmix matrix for a row-wise scan order or the number of non-zero entries of the downmix matrix per respective column for a column-wise scan order.

In embodiments, the downmixing unit may be further adapted to, for the at least one frequency bin, assign sums of one or more products of the entries of the third array with the corresponding entries of the first array for the respective frequency bin to the entries of the second array on the basis of the entries of the fifth array.

According to another aspect, a software program is described. The software program may be adapted for execution on a processor and for performing the method steps outlined in the present document when carried out on a computing device.

According to another aspect, a storage medium is described. The storage medium may include a software program adapted for execution on a processor and for performing the method steps outlined in the present document when carried out on a computing device. For example, a non-transitory computer-readable medium with instructions stored thereon that may be executed by one or more processors.

According to a further aspect, a computer program product is described. The computer program may include executable instructions for performing the method steps outlined in the present document when executed on a computer.

It should be noted that the methods and apparatus including its preferred embodiments as outlined in the present document may be used stand-alone or in combination with the other methods and systems disclosed in this document. Furthermore, all aspects of the methods and apparatus outlined in the present document may be arbitrarily combined. In particular, the features of the claims may be combined with one another in an arbitrary manner.

DESCRIPTION OF THE DRAWINGS

Through the following detailed description with reference to the accompanying drawings, the above and other objectives, features and advantages of the example embodiments will become more comprehensible. In the drawings, several embodiments will be illustrated in an example and non-limiting manner, wherein.

DETAILED DESCRIPTION

Figure 1:
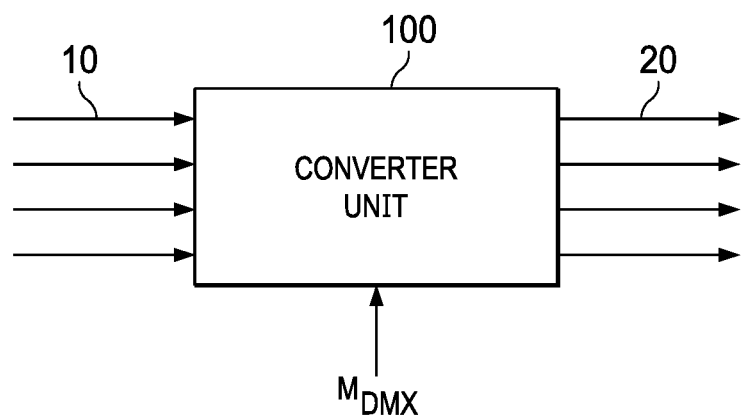
FIG. 1 schematically illustrates an example of a format converter to which example embodiments of the disclosure may be applied.

First, relevant aspects of the format converter of the main profile of the MPEG-H 3D Audio standard will be briefly described. For a more comprehensive discussion of the MPEG-H 3D Audio standard, reference is made to document ISO/IEC DIS 23008-3 "*Information technology—High efficiency coding and media delivery in heterogeneous environments—Part* 3: *3D audio*", which is hereby incorporated by reference in its entirety. Section 10 of this document relates to the format converter.

In summary, the Main Profile format converter of the MPEG-H 3D Audio Standard provides for a phase-align Quadrature Mirror Filter (QMF) domain downmix involving QMF filterbanks (hybrid QMF) and phase-alignment processing, the latter including a covariance analysis of the input signals (input channels). In particular, the Main Profile format converter uses a QMF representation of the input audio channels (hybrid QMF), together with a Nyquist filterbank for increasing the frequency resolution in the lowest processing band, in order to be able to more effectively address and prevent signal cancellations or signal boosts.

The QMF filterbank of the Main Profile format converter is designed to deliver comparatively high time resolution and features a hop size of 64 samples for an analysis window length of 640 samples. Thus, there is a 90% overlap between subsequent filterbank analysis results, which results in comparatively high computational cost and memory access rates. While the resulting high time resolution is beneficial for preventing modulation artefacts in the context of phase alignment, it is not required for the actual downmix operation.

In view of avoiding high computational complexity, a Low Complexity (LC) profile of the MPEG-H 3D Audio standard incorporating a format conversion functionality is envisaged. Broadly speaking, the format converter of the LC profile reduces the number audio channels by downmixing when the number of available loudspeaker channels is smaller than the number of input channels. The format converter attempts to maintain a faithful audio image resembling the original one despite the reduced number of channels. Towards this purpose, the downmixer includes adaptive equalization that controls the energy of the output channels relative to the energy of the input channels over individual audio bands (processing bands).

The LC format converter operates on a frequency representation of the input signal with time-frequency resolution appropriate for downmixing. Contrary to the main profile format converter, the format conversion functionality incorporated in the LC profile may not involve a QMF filterbank, thereby reducing computational complexity of format conversion. Instead, the LC profile format converter may operate in a Short Time Fourier Transform (STFT), such as the Discrete Fourier Transform (DFT) domain. This time-frequency representation may be obtained by applying a complex Fast Fourier Transform (FFT) onto windowed input audio channels. The STFT may have a length (analysis window length) of 512 samples. The hop size may be 256 samples, i.e. the overlap between subsequent analysis windows may be 50%. The STFT may further perform a sqrt(Hann) (Hanning) analysis and synthesis window.

The frequency bins (transform domain frequency bins) of the time-frequency transform may be grouped into audio bands (processing bands) for equalization. For example, the STFT may have 58 processing bands. These processing bands may be defined in accordance with a psychoacoustic model. For example, the frequency resolution at high frequencies may be reduced in order to reduce computational complexity.

The actual downmixing of the input audio channels may then proceed on the frequency coefficients obtained by the time-frequency transform. Downmixing matrices employed in this downmixing may be different from each other for different processing bands. Intermediate audio channels (e.g., their frequency coefficients) obtained by application of the respective downmix matrix may then be subjected to energy equalization, in order to ensure energy preservation.

On the other hand, the LC format converter does not involve phase-alignment and therefore does not involve a covariance analysis. In order to compensate for omission of phase alignment, the processing bands of the STFT may be further defined so as to increase the frequency resolution in the mid-frequency range (compared to the hybrid QMF downmix processing of the main profile format converter) (e.g., a range of greater than or less than about 100 Hz to greater than or less than 3.5 kHz or a range of 100 Hz to 3.5 kHz).

Notably, the LC format converter for the MPEG-H 3D Audio standard has been devised to be compatible with the Main Profile format converter design, to provide good audio signal quality, to satisfy energy preservation, and foremost, to reduce computational complexity.

The present disclosure relates to the actual downmixing and the equalization and teaches advantageous strategies for efficiently performing these steps, thereby further reducing computational complexity of the format converter.

It is however understood that many aspects of the present disclosure are independent of the particular time-frequency transform used by the LC format converter and could be applied in a straightforward manner also to format converters employing a QMF representation of audio channels, for example.

As illustrated in FIG. 1, the format converter 100 (e.g., the audio processing block of the format converter) of an audio decoder receives (decoded) time domain audio samples for $N_{in}$ audio channels (input audio channels) 10 for example, from the core decoder of the audio decoder and generates a downmixed time domain audio output signal consisting of $N_{out}$ output audio channels 20. The number of audio output channels is smaller than or equal to the number of input audio channels, (e.g., $N_{out} \le N_{in}$). The actual downmixing process may be performed in the frequency domain. A downmix matrix $M_{DMX}$ for downmixing the $N_{in}$ input audio channels may be provided to the format converter 100 (e.g., by the core decoder). Thus, the processing of the format converter 100 takes the audio data decoded by the core decoder and the (static) downmix matrix $M_{DMX}$ as input. The downmix matrix $M_{DMX}$ may be provided (e.g. signaled) to the format converter on initialization (startup) of the format converter, optionally together with a desired output channel configuration for the output audio channels. The downmix matrix $M_{DMX}$ or an indication thereof may be transmitted in the audio bitstream that is provided to the audio decoder. Notably, the MPEG-H 3D Audio standard allows for transmission of downmix specifications (including indications of downmix matrices) for specific target channel configurations. The downmix matrix $M_{DMX}$ may contain real-valued non-negative downmix coefficients and may be of dimension $N_{out} \times N_{in}$. That is, the number of rows of the downmix matrix may be given by $N_{out}$ and the number of columns of the downmix matrix may be given by $N_{in}$. While specific examples in the remainder of this document assume that the downmix matrix is of dimension $N_{out} \times N_{in}$, these specific examples likewise apply to the case of a downmix matrix of dimension $N_{in} \times N_{out}$, in which case the notions of columns and rows would have to be exchanged for each other in the specific examples.

Figure 2:
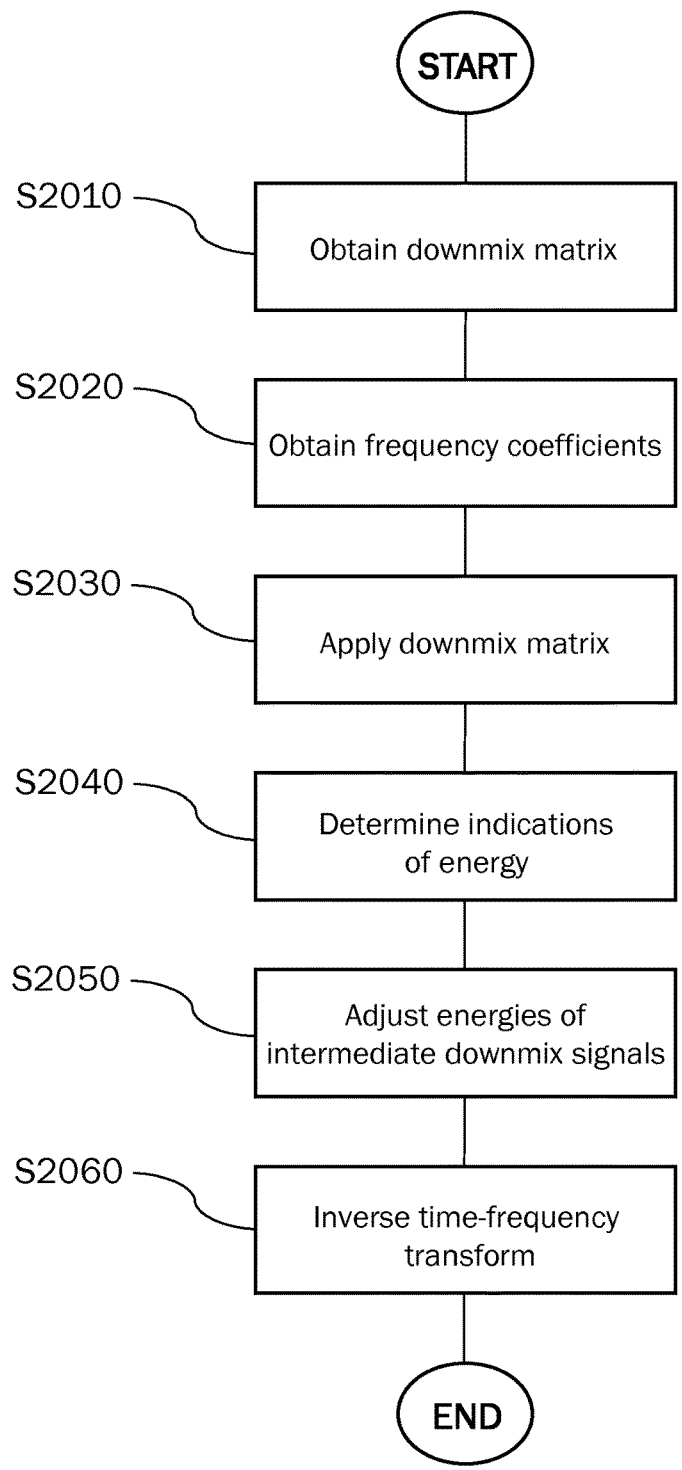
FIG. 2 is a flowchart schematically illustrating an example of a process of format conversion by the format converter according to embodiments of the disclosure.

FIG. 2 is a flow chart schematically illustrating a process (method) of format conversion (downmixing), as may be performed (e.g., by the format converter 100). This method relates to processing of one block (e.g. frame) of time domain samples and may be repeated for subsequent blocks of time domains samples.

At step S2010, the (static) downmix matrix $M_{DMX}$ may be obtained, for example by signaling from a source external to the format converter. In other words, the method (i.e., the format converter) may receive the downmix matrix $M_{DMX}$ as an input. Instead of a single downmix matrix $M_{DMX}$, a plurality of downmix matrices $M_{DMX}^k$ may be obtained, one for each frequency bin of the frequency coefficients obtained at step S2020. Step S2010 may be performed on initialization of the method (e.g., of the format converter) and may be omitted in case the downmix matrix has been obtained earlier. The downmix matrix may remain constant in time during a session until the format converter module or the entire receiving side of the audio decoder is reset (e.g. upon a change in the output channel configuration).

The notion of the downmix matrix being constant in time also relates to the case that a (static) set of (two or more) downmix matrices $M_{DMX,l}^k$ for $2 \le l$ is obtained, from which a downmix matrix that is to be used for downmixing can be used on a per-frame basis. Thus, the downmix matrix $M_{DMX}^k$ mentioned above may be chosen, on a per-frame basis, from the (static) set. Selection of the downmix matrix that is to be used for a given frame may proceed on the basis of an indication of a rendering type for the given frame that may be received with the bitstream.

The method may further comprise receiving, as input, a plurality of input audio channels (input audio signals). In particular, the method may comprise receiving (sequences of) time domain samples of the plurality of input audio channels.

At step S2020, a plurality of frequency coefficients in a plurality of frequency bins (one frequency coefficient per frequency bin) may be obtained for each of the input audio channels. For example, said plurality of frequency coefficients in the plurality of frequency bins for each of the input audio channels may be received from a bitstream. Alternatively, a time-frequency transform may be applied to each of the plurality of input audio channels (e.g., to the time domain samples of each of the plurality of input audio channels). This time-frequency transform may yield, for each of the input audio channels, the plurality of frequency coefficients in the plurality of frequency bins.

Format conversion may operate on contiguous, non-overlapping frames. Said frames may have a length L in units of time domain samples of the input audio signals (e.g. L=256 time domain samples). Format conversion may output one frame of L samples per processed input frame of length L. The output frame has fewer audio signal channels than the input frame (or at most, the same number of audio signal channels).

The time-frequency transform may be a STFT, such as a DFT. A length N of the STFT may be N=512 samples. A hop size of the STFT may be 256 samples, in which case the overlap between subsequent STFTs would be 256 samples, or 50%. The STFT domain processing may operate on K=256 frequency bins, for example. The frequency bins may be partitioned into a plurality of audio bands (processing bands) for processing, e.g. into B=58 processing bands.

In some example embodiments, applying the time-frequency transform may involve updating an input buffer (e.g. first-in, first-out (FIFO) buffer) of length N (e.g., 512 time domain samples) by one frame (L time domain samples, e.g. 256 time domain samples) of the $N_{in}$ time domain input audio channels. Denoting the input buffer for a given input audio channel $1 \le i \le N_{in}$ by $\hat{x}_i^v$ and the time domain samples of the plurality of input audio channels by $[\tilde{x}_1^v, \ldots, \tilde{x}_{N_{in}}^v] = (\tilde{x}^v)^T$, where v is an index indicating time domain samples and $(\cdot)^T$ indicates the transpose, the input buffer for the given input audio channel i may be given by $$\hat{x}_i^v = \begin{cases} \tilde{x}_i^{v,F-1} & \text{for } 0 \le v < L \\ \tilde{x}_i^{v-L,F} & \text{for } L \le v < N \end{cases} \quad [1]$$

where F denotes the frame index, and $\tilde{x}_i^{v,F-1}=0$ for the first processing frame. Each of the $N_{in}$ input audio channels in the input buffer may be windowed (e.g. with a sine window). A time-frequency transform, such as a discrete Fourier transform (DFT) of length N (e.g. N=512 sample) may be calculated for each of the $N_{in}$ input audio channels (input audio signals) in the input buffer (e.g. windowed input buffer), thus yielding frequency coefficients $x_i^k$, where k indicates the frequency bin. For each frequency bin, an $N_{in}$-dimensional vector with complex frequency coefficients as its entries (elements) may be obtained. For example, the frequency coefficients may be given by $$x_i^k = \sum_{v=0}^{N-1} w[v] \cdot \hat{x}_i^v \cdot e^{-2\pi jkv/N} \quad [2]$$

for $1 \le i \le N_{in}$ and $0 \le k \le K-1$. The frequency index k may be omitted in the following if the same processing is applied to all frequency bins. The window function may be given for example by $w[v]=\sin((v+0.5)\pi/N)$.

At step S2030, the downmix matrix is applied (e.g. for each frequency bin), to a first array (e.g., vector) formed by the frequency coefficients of the plurality of input audio channels in the respective frequency bin. In other words, the actual downmix may be performed (e.g. in each frequency bin, that is, frequency bin by frequency bin). In the adopted notation, the first array for the k-th frequency bin would be denoted $[x_1^k, \ldots, x_{N_{in}}^k]=(x^k)^T$ and has dimension $N_{in}$ (e.g., has $N_{in}$ entries). Although the downmix matrix is constant in time, each frequency bin k may be associated with an individual (specific) $N_{out} \times N_{in}$ downmix matrix $M_{DMX}^k$. That is, the downmix matrix $M_{DMX}$ may depend on the index of the frequency bins, i.e. may be given by $M_{DMX}^k$ for $0 \le k \le K-1$. By applying the downmix matrix, a second array (e.g. vector) formed by the frequency coefficients of a plurality of intermediate audio channels (intermediate downmix channels) in the respective frequency bin may be obtained.

In the above and in the remainder of this section, the proposed method is stated to be performed for each frequency bin. It is however understood that the method in general may be performed for least one frequency bin (e.g. for a single frequency bin), for all frequency bins within a group of frequency bins (e.g. within a given audio band), or for all frequency bins of the time-frequency transform.

The number of the intermediate audio channels may be equal to the number $N_{out}$ of the output audio channels, and the intermediate audio channels and the output audio channels may be in a one-to-one relationship. The output audio channels may be obtained from the intermediate audio channels by adjusting magnitudes of their frequency coefficients.

Denoting the frequency coefficient of the o-th intermediate audio channel for $1 \le o \le N_{out}$ in the k-th frequency bin by $\bar{z}_o^k$, the frequency coefficient in the k-th frequency bin of the o-th intermediate audio channel may be given by $$\bar{z}_o^k = \sum_{i=1}^{N_{in}} x_i^k (M_{DMX}^k)_{o,i} \quad [3]$$

where $(M_{DMX}^k)_{o,i}$ is an entry of the downmix matrix $M_{DMX}^k$. In the adopted notation, the second array for the k-th frequency bin would be denoted $[\bar{z}_1^k, \ldots, \bar{z}_{N_{out}}^k]=(\bar{z}^k)^T$ and has dimension $N_{out}$ (i.e. has $N_{out}$ entries). The second array may be said to be obtained by a matrix multiplication of the downmix matrix and the first array (e.g., $\bar{z}^k = M_{DMX}^k x^k$). Notably, the entries of the downmix matrix $M_{DMX}^k$ may be real, whereas $x_i^k$ and $\bar{z}_o^k$ may be complex. It is further understood that for a downmix matrix that is uniform over the frequency bins, the index k of the downmix matrix may be suppressed in the foregoing equations.

To reduce audible artefacts that may occur in the intermediate audio channels (intermediate audio signals), the intermediate audio channels may be further processed by adaptive equalization to control the energies of the downmixed audio bands. Towards this purpose, the format converter computes first and second indications of energy described below.

At step S2040, a first indication of energy of the respective intermediate audio channel (e.g., the indication of energy referred to in the claims) may be determined for each frequency bin. Therein, the same indication of energy may be assigned to multiple frequency bins. For example, frequency bins that are comprised by the same processing band may have the same indication of energy. For example, for each processing band $0 \le b \le B-1$, where $B \le N$, the indication of energy $\bar{Z}_o^b$ of the o-th intermediate audio channel for all frequency bins k within the b-th processing band (denoted by frequency bins k for which an assignment function to processing bands band( ) yields band(k)=b) may be given by $$\bar{Z}_o^b = \sum_{i=1}^{N_{in}} \sum_{k,band(k)=b} |x_i^k|^2 ((M_{DMX}^k)_{o,i})^2 \quad [4]$$

According to this example, the first indication of energy for a given intermediate audio channel for a given frequency bin may depend on a sum, over all input audio channels and over all frequency bins in the same processing band as the given frequency bin, of the absolute squares of the products of the frequency coefficients of the input audio channels and corresponding entries of the downmix matrix. In general, the first indication of energy for a given intermediate audio channel for a given frequency bin may depend on a sum over all input audio channels and optionally over all frequency bins within the same processing band as the given frequency bin, of products of powers (e.g. first power, second power, third power and the like.) of absolute values of the frequency coefficients of the input audio channels with powers (e.g. first power, second power, third power etc.) of corresponding entries of the downmix matrix. Notably, the entries of the downmix matrix may be real whereas the entries of the first array may be complex. Here, "corresponding entries" of arrays (vectors, matrices) means those entries that would be multiplied with each other in regular matrix multiplication of these arrays.

Further, a second indication of energy may be determined for each frequency bin. Also here, the same second indication of energy may be assigned to multiple frequency bins. For example, frequency bins that are comprised by the same processing band may have the same second indication of energy. For example, for each processing band $0 \le b \le B-1$, the second indication of energy $\bar{\bar{Z}}_o^b$ of the o-th intermediate audio channel for all frequency bins k within the b-th processing band may be given by $$\overline{Z}_o^b = \sum_{k, band(k)=b} |z_o^k|^2 = \sum_{k, band(k)=b} \left| \sum_{i=1}^{N_{in}} x_i^k (M_{DMX}^k)_{o,i} \right|^2 \quad [5]$$

Accordingly, the second indication of energy for a given intermediate audio channel and for a given frequency bin may depend on a sum, over all frequency bins in the same processing band as the given frequency bin, of the absolute squares of the frequency coefficients for the given intermediate audio channel and the respective frequency bins, for example, on a sum, over all frequency bins in the same processing band as the given frequency bin, of the absolute squares of the sums, over all input audio channels, of the products of the frequency coefficients of the input audio channels and corresponding entries of the downmix matrix.

The above calculations (determinations) of the first and second indications of energy require determining and accessing frequency bins that are assigned to the same audio band. This may be done by referring to a lookup table that lists, for each frequency bin, the audio band that the respective frequency bin belongs to. However, reference to such table in the context of determining the first and second indications of energy may be computationally costly since it requires indirect addressing at multiple occasions. In order to overcome this issue, an alternative lookup table may be provided that lists, for each audio band b, the number Nb(b) of frequency bins belonging to the respective audio band b. Since each audio band comprises neighboring frequency bins without overlap or gaps between adjacent audio bands, the information contained in the alternative lookup table is sufficient for determining the first and second indication of energy. When determining the first or second indications of energy, starting from the first audio band, the first Nb(0) terms in the sum over k may be summed up and assigned to the first or second indication of energy for the first audio band (for a respective intermediate audio channel), and so forth. In general, starting from band index b=0 and iteratively incrementing the band index b by 1 at a time, Nb(b) successive terms in the sums over k in equations [4] and/or [5] may be summed up and assigned to the respective indication of energy for the b-th audio band (for the respective intermediate audio channel). That is, successive terms in the sums over k may be summed and assigned to the respective indication of energy for respective audio bands in accordance with the numbers Nb determined (e.g. inferred from the alternative lookup table) for the audio bands.

For a downmix matrix $M_{DMX}$ that is constant over a plurality of frequency bins or audio bands, the downmix matrix in equations [4] and [5] above may be factored out for the frequency bins or audio bands in question, thereby further reducing computational costs. For example, computation of equation [4] may be simplified to $$\overline{Z}_o^b = \sum_{i=1}^{N_{in}} ((M_{DMX}^b)_{o,i})^2 \sum_{k, band(k)=b} |x_i^k|^2 \quad [6]$$

where $M_{DMX}^b$ is the downmix matrix that is constant over the frequency bins in the b-th audio band (i.e. frequency bins with band(k)=b). A similar simplification may be applied to equation [5].

At step S2050, the energies of the intermediate downmix signals may be adjusted. That is, a magnitude of the respective frequency coefficient may be adjusted for each intermediate audio channel and for each frequency bin. Said adjustment may be performed on the basis of either one or both of the first indication of energy and the second indication of energy for the respective intermediate audio channel and for the respective frequency bin. In general, the adjustment may be said to be performed on the basis of an indication of energy for the respective intermediate audio channel and for the respective frequency bin. An adjustment factor $e_o^k$ may be determined on the basis of either one or both of the first indication of energy and the second indication of energy for the respective intermediate audio channel and for the respective frequency bin. Using this adjustment factor, the energy-adjusted frequency coefficient for the o-th output audio channel (corresponding to the o-th intermediate audio channel) and the k-th frequency bin may be given by $$z_o^k = \overline{z}_o^k \cdot e_o^k \quad [7]$$

The adjustment factor $e_o^k$ for the o-th intermediate audio channel and the k-th frequency bin may be determined as a function of the first indication of energy $Z_o^b$ and the second indication of energy and the second indication of energy $\overline{Z}_o^b$ where band(k)=b. The first indication of energy may be subjected to a smoothing function by determining a weighted sum of the first and indication of energy for the current frame and for the previous frame. Likewise, the second indication of energy may be subjected to a smoothing function by determining a weighted sum of the second indication of energy for the current frame and for the previous frame. For example, the adjustment factor $e_o^k$ for the o-th intermediate audio channel and the k-th frequency bin may be given by $$e_o^k = \min(10^{0.4}, \max(10^{-0.5}, \tilde{e}_o^k)) \quad [8]$$

where $$\tilde{e}_o^k = \sqrt{\frac{\langle \overline{Z}_o^{b,F} \rangle}{\varepsilon + \langle \overline{Z}_o^{b,F} \rangle}} \quad [9]$$

for band(k)=b. The weighted sums $\langle Z_o^b \rangle$ and $\langle \overline{Z}_o^b \rangle$ may be given by $$\langle Z_o^{b,F} \rangle = \alpha Z_o^{b,F} + (1-\alpha) \langle Z_o^{b,F-1} \rangle \quad [10]$$

$$\langle \overline{Z}_o^{b,F} \rangle = \alpha \overline{Z}_o^{b,F} + (1-\alpha) \langle \overline{Z}_o^{b,F-1} \rangle \quad [11]$$

where α is a filter parameter (e.g., α=0.0435), ε is a small numerical constant (e.g., ε=$10^{-35}$) for preventing a division by zero, and F indicates the current frame. Notably, $\langle Z_o^{b,F-1} \rangle$ and $\langle \overline{Z}_o^{b,F-1} \rangle$ may be initialized to zero for the first processing frame.

At step S2060, a frequency-time transform (inverse time-frequency transform, e.g. the inverse of the time-frequency transform in step S2020) may be applied to the energy-adjusted frequency coefficients generated at step S2050. The inverse time-frequency transform may be performed for each processed frame (e.g., 256 samples). The energy-adjusted downmix signals may be transformed to the time domain by application of an inverse DFT, e.g. FFT. This may further involve windowing and an overlap update. As a result, step S2060 may yield L time domain output samples per output signal channel.

For the current frame F, the processing of step S2060 may be given by $$\hat{z}_o^{v,F} = w[v] \cdot \frac{1}{N} \sum_{k=0}^{N-1} \overset{vk}{z_o} \cdot e^{\frac{2\pi jkv}{N}} \quad [12]$$

for $0 \leq v < N$, with $$\overset{vk}{z_o} = \begin{cases} z_o^k & \text{for } 0 \leq k < K \\ (z_o^{N-k})^* & \text{for } K \leq k < N \end{cases} \quad [13]$$

where $(\cdot)^*$ indicates the complex conjugate. Then, the time domain samples of the output audio channels may be given by $$\hat{z}_o^{v,F} = \hat{z}_o^{v,F} + \hat{z}_o^{v+L,F-1} \quad [14]$$

for $0 \leq v < L$. Therein, $\hat{z}_o^{v,F-1}$ may be initialized to zeros for the first processing frame.

It is understood that the method described above may be repeated for subsequent frames of time domain samples. In this case, the downmix matrix need not be obtained for each frame, and step S2010 may be omitted (e.g. for subsequent frames).

Figures 3, 4:
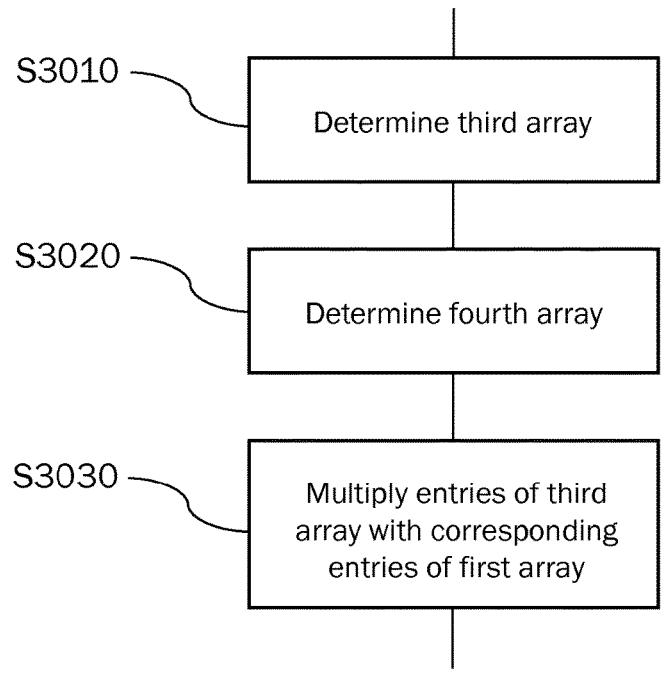
FIG. 3 is a flowchart schematically illustrating examples of details of a step in the process of FIG. 2 according to embodiments of the disclosure.
FIG. 4 schematically illustrates an example of the downmix matrix and arrays derived therefrom according to embodiments of the disclosure.

Turning now to FIG. 3, a flowchart is provided which schematically illustrates examples of details of a step in the process of FIG. 2. That is, details of step S2030 will be described with reference to the flowchart illustrated in FIG. 3. More specifically, the step of applying the downmix matrix to the first array S2030 may involve some or all of steps S3010 to S3030.

At step S3010, a third array (e.g. vector, that is, linear array) M including only the non-zero entries (elements) of the downmix matrix $M_{DMX}$ may be determined. The non-zero entries of the downmix matrix may be extracted in a predetermined scan order, and arranged in the third array in the order in which they occur, in the scan order, in the downmix matrix. In other words, an n-th entry in the third array M represents the n-th non-zero entry in the downmix matrix $M_{DMX}$ in the scan order. The scan order may be row-wise or column-wise, for example. For the case of the downmix matrix being of dimension $N_{out} \times N_{in}$, the scan order may be row-wise. The embodiments of the disclosure provided in the remainder of the present document will assume row-wise scan order. However, these embodiments shall not be construed as being limited to row-wise scan order and it is understood that by exchanging columns for rows and vice versa, these embodiments may be readily adapted to the case of column-wise scan order.

Referring now to FIG. 4, an example of the downmix matrix and arrays derived therefrom according to embodiments of the disclosure is schematically illustrated. That is, an example of a downmix matrix $M_{DMX}$ and the corresponding third array M is illustrated in FIG. 4. Also shown in FIG. 4 is an example of a fourth array s and a fifth array r. In this example, the downmix matrix $M_{DMX}$ has six non-zero entries, namely 1, 4, 2, 6, 3, 5 in a row-wise scan order. Thus, for row-wise scan order, the third array M has 6 entries and is given by $(M)^T = [1,4,2,6,3,5]$.

At step S3020, a fourth array (e.g. vector, that is, linear array) s may be determined, wherein the entries of the fourth array s may be in a correspondence relationship to the entries of the third array M. Each entry of the fourth array s may indicate the position (e.g. linear position) that the respective corresponding entry in the third array M has in the downmix matrix $M_{DMX}$ in the scan order. In other words, an n-th entry in the fourth array s represents the position that the n-th entry of the third array M (e.g., the n-th non-zero entry in the scan order in the downmix matrix $M_{DMX}$) has, in the scan order, in the downmix matrix $M_{DMX}$. In some example embodiments, for row-wise scan order, the (linear) position in the scan order may be given modulo the row length (e.g., may depend on the remainder of a division by the row length), for example may indicate the column of the downmix matrix in which the respective entry of the third array is located. Alternatively, for column-wise scan order, the (linear) position in the scan order may be given modulo the column height (i.e. may depend on the remainder of a division by the column height), for example may indicate the row of the downmix matrix in which the respective entry of the third array is located. For the case of a downmix matrix of dimension $N_{out} \times N_{in}$, the row length is given by $N_{in}$ and the column height is given by $N_{out}$.

In alternative embodiments, the entries of the fourth array s may be indicative of an offset from the first position in the scan order in the downmix matrix. In further alternative embodiments, the entries of the fourth array s may be indicative of a relative offset between positions of one non-zero entry of the downmix matrix $M_{DMX}$ to the next, in the scan order (i.e. an offset from a position of a preceding entry of the respective entry of the third array within the downmix matrix in the scan order). In yet further alternative embodiments, the entries of the fourth array s may be indicative of, for each corresponding non-zero entry of the third array M, a relative offset of the position of the corresponding non-zero entry in its row from the position its respective preceding entry in the respective row, or from the first position in the respective row if the corresponding non-zero entry is the first entry in its row. While the aforementioned implementation of the fourth array s applies to the case of a row-wise scan order, it can be readily adapted to a column-wise scan order by exchanging rows for columns.

In the example of FIG. 4, the fourth array s may be given by $(s)^T = [1,4,2,6,3,5]$ and its entries may indicate the columns in the downmix matrix in which the respective entries of the third array are located (i.e. had been located before extraction to the third array M). Alternatively, if the entries of the fourth array s were to indicate respective offsets from the first position in the (row-wise) scan order in the downmix matrix $M_{DMX}$, the fourth array s would be given by $(s)^T = [0,3,7,11,14,16]$, and if the entries of the fourth array s were to indicate relative offset between positions of one non-zero entry of the downmix matrix $M_{DMX}$ to the next, in the (row-wise) scan order, the fourth array s would be given by $(s)^T = [0,3,4,4,3,2]$. If the entries of the fourth array s were to indicate relative offsets from the position of the preceding or first entry in respective rows, the fourth array s would be given by $(s)^T = [0,3,1,4,2,2]$.

Although not shown in FIG. 3, step S2030 may further involve a step of determining a fifth array r, the entries of which indicate the number of non-zero entries per row or per column of the downmix matrix $M_{DMX}$. Therein, whether the entries of the fifth array r are indicative of the number of non-zero entries per row or per column depends on the scan order: for row-wise scan order, the entries of the fifth array r indicate the number of non-zero entries of the downmix matrix $M_{DMX}$ per row, and for column-wise scan order, the entries of the fifth array r indicate the number of non-zero entries of the downmix matrix $M_{DMX}$ per column. In the example of FIG. 4, the fifth array is given by $(r)^T = [2,2,2]$. For column-wise scan order, the fifth array would be given by $(r)^T = [1,1,1,1,1,1]$. Needless to say, the entries of the fifth array r have the same order as the rows or columns of the downmix matrix have in the downmix matrix, from first to last. That is, an m-th entry of the fifth array r indicates the number of non-zero coefficients in the m-th row (or column) of the downmix matrix $M_{DMX}$, where m runs from 1 to the number of rows (or columns) in the downmix matrix $M_{DMX}$, for example the first entry of the fifth array r indicates the number of non-zero coefficients in the first row (or column) of the downmix matrix $M_{DMX}$, and so forth.

Further, the first indications of energy $Z_o^k$ for a given frequency bin k may be collected in a sixth array (linear array, e.g. vector) $(\overline{Z}^k)^T = [Z_1^k, \ldots, Z_{N_{out}}^k]$ and the second indications of energy $\overline{Z}_o^k$ for a given frequency bin k may be collected in a seventh array (linear array, e.g. vector) $(\overline{Z}^k)^T = [\overline{Z}_1^k, \ldots, \overline{Z}_{N_{out}}^k]$.

It is understood that the determination of the third, fourth and fifth arrays may be performed in any order. It is further understood that if the downmix matrix $M_{DMX}$ depends on the frequency bins, the aforementioned steps may be performed for each frequency bin, or for groups of frequency bins (processing bands) if the downmix matrix $M_{DMX}$ is identical for the frequency bins within respective groups of frequency bins. If the downmix matrix $M_{DMX}^k$ depends on the frequency bins, also the third array $M^k$, the fourth array $s^k$, and the fifth array $r^k$ may be indexed by their respective frequency bin. It is yet further understood that any of the aforementioned steps may be omitted if the respective third, fourth or fifth array is already at hand for the downmix matrix in question. That is, for each obtained downmix matrix $M_{DMX}$ or $M_{DMX}^k$, the third, fourth and fifth arrays only need to be determined once throughout the format conversion (e.g. upon initialization of the format converter module) and may be stored in a static memory and referred to when the format converter module is invoked once a frame. In other words, for each obtained downmix matrix, the sparse matrix representation (including or represented by the third to fourth arrays) may only be determined once, and may be referred to throughout the current session of the format converter module.

Referring back to FIG. 3, at step S3030, the entries of the third array M may be multiplied with corresponding entries of the first array (e.g. for each frequency bin). By these multiplications, the actual determination of the frequency coefficients of the intermediate audio channels (e.g., the actual downmixing) may be performed, or at least part of this determination. That is, this determination may involve multiplying, for each frequency bin, the entries of the third array M (e.g. for the respective frequency bin) with corresponding entries of the first array (e.g. for the respective frequency bin). Therein, an entry of the first array is said to correspond to an entry of the third array if it would be multiplied with the corresponding non-zero entry of the downmix matrix $M_{DMX}$ in regular matrix multiplication of the first array and the downmix matrix. Said corresponding entries of the first array may be determined on the basis of the fourth array (e.g. on the basis of the entries of the fourth array). The entries of the fourth array may indicate the positions that respective entries of the third array M have had in the downmix matrix $M_{DMX}$, which then enables to determine, for each such entry of the third array M, the entry of the first array that would be multiplied with this entry of the third array M in regular matrix multiplication of the first array with the downmix matrix $M_{DMX}$.

Appropriate products of entries may be summed up for each entry of the second array (for the respective frequency bin). The assignment of sums of (one or more) products to the entries of the second entry may be performed on the basis of the fifth array r. Each entry of the fifth array r may indicate, for the respective entry of the second array, how many products need to be summed up and assigned to the respective entry of the second array. When starting from the first entry of the second array, consecutively assigning sums of the determined products, in the order in which these products are determined, to the entries of the second array, wherein the number of terms in each sum is determined by respective entries of the fifth array r, will then yield all entries of the second array. Thus, in general terms, applying the downmix matrix to the first array may be said to further involve, for each frequency bin, assigning sums of one or more products of the entries of the third array with the corresponding entries of the first array for the respective frequency bin to the entries of the second array on the basis of the entries of the fifth array. Notably, the fifth array r and the second array $\overline{z}$ have dimension $N_{out}$ (e.g., each have $N_{out}$ entries).

In some example embodiments, applying the downmix matrix to the first array further may involve successively incrementing an entry index to the third array by one at a time and determining, for each such entry index, a product of the entry of the third array indicated by the respective entry index with the corresponding entry of the first array for the respective frequency bin. The corresponding entry of the first array may be determined by referring to the fourth array. For any given entry of the third array M, the entry's position within the downmix matrix may be determined from the corresponding entry of the fourth array (wherein the j-th entry of the fourth array corresponds to the j-th entry of the third array, where j is an integer between 1 and the number of non-zero entries in $M_{DMX}$. For example, the column number of the entry in question may be determined from the respective entry of the fourth array s. The entry of the first array that corresponds to the entry in question of the third array M may then be determined as the entry of the first array that has the determined column number as its entry index within the first array. Applying the downmix matrix to the first array may further involve sequentially assigning sums of one or more of these products to the entries of the second array, wherein the assignment may be based on the entries of the fifth array. That is, the number of products in the sum that is to be assigned to an entry of the second array may be determined by the entry of the fifth array that has the same entry index as the entry in question of the second array. For successively determined products of entries of the third array with corresponding entries of the first array, the determined products may be successively added to the entries of the second array in their order within the second array (assuming that the entries of the second array are initialized to zero beforehand), wherein the number of successively determined products that is to be added to each entry of the second array may be determined from the corresponding entry of the fifth array. Notably, these steps may be performed for each frequency bin.

Figure 5:
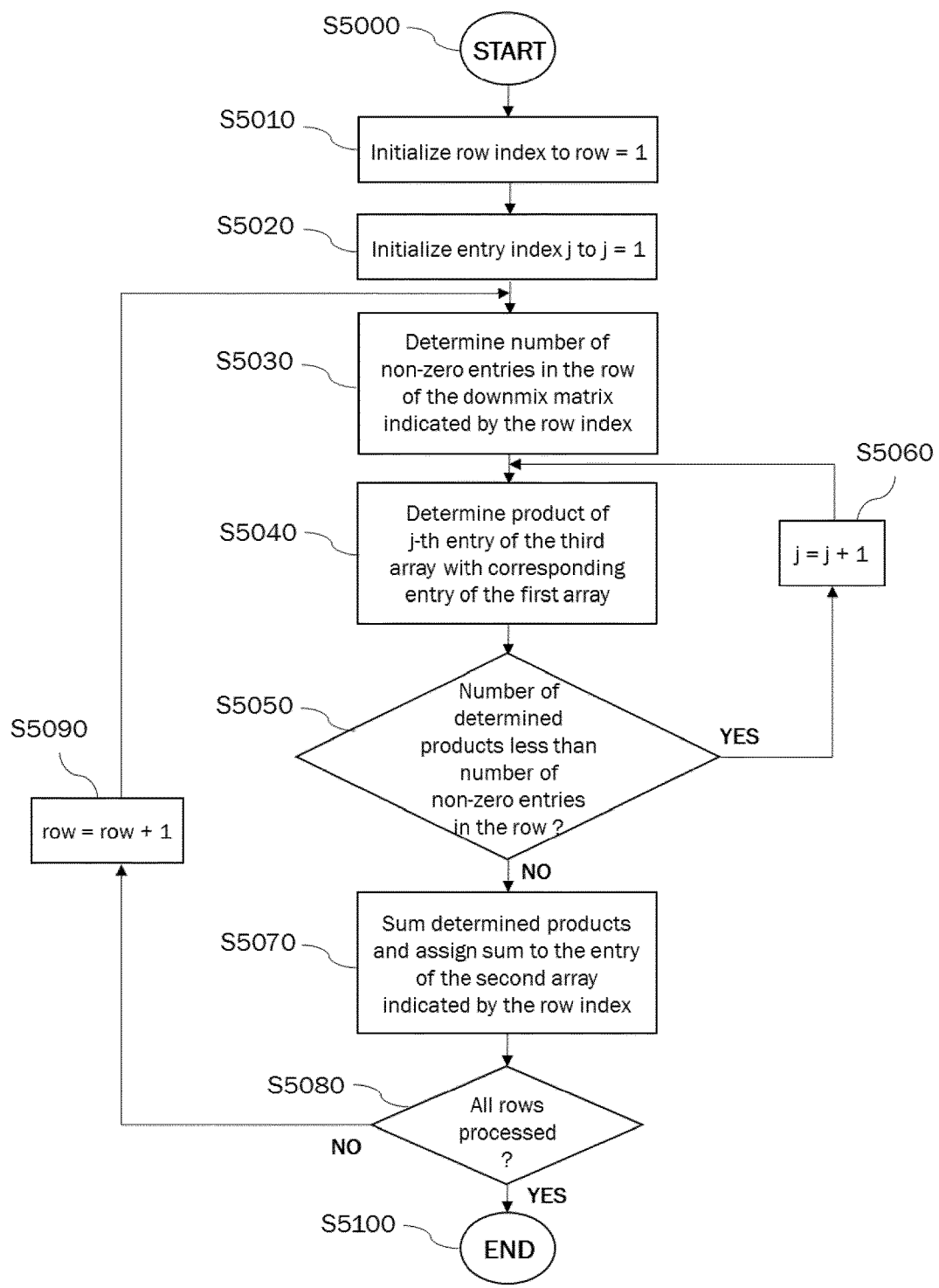
FIG. 5 is a flowchart schematically illustrating examples of details of a step in the process of FIG. 3 according to embodiments of the disclosure.

FIG. 5 illustrates an example according to embodiments of the disclosure for the actual determination of the frequency coefficients of the intermediate audio channels (e.g., the actual downmixing) at step S3030 in FIG. 3 in line with the above. That is, said downmixing may involve some or all of steps S5010 to S5090. Notably, the example of FIG. 5 relates to the case of a row-wise scan order, but may be readily adapted to relate to the case of a column-wise scan order. Moreover, entries of the first and second arrays are typically complex and the operations described below need to take into account both the real and imaginary parts.

The method starts at step S5000. At step S5010, the row index may be initialized to row=1. That is, the first entry of the second array will be determined (calculated) first. At step S5020, the entry index (to the third and fourth arrays) may be initialized to j=1.

At step S5030, the number of non-zero entries in the row of the downmix matrix $M_{DMX}$ that is indicated by the row index row may be determined. This determination may be performed by referring to the entry of the fifth array r that is indicated by the row index row, (e.g., by referring to $r_{row}$). The entry of the fifth array r that is indicated by the row index row directly indicates the number of non-zero coefficients in the row of the downmix matrix $M_{DMX}$ that is indicated by the row index row.

In case that the row of the downmix matrix $M_{DMX}$ that is indicated by the row index row does not contain any non-zero entries, the method may assign the (complex) value zero to the entry of the second array that is indicated by the row index row and skip steps S5040 to S5070.

At step S5040, the j-th entry of the third array M and the corresponding entry of the first array may be multiplied with each other in order to determine their product. The entry of the first array that corresponds to the j-th entry of the third array M may be determined by referring to the j-th entry of the fourth array s. The j-th entry of the fourth array s may indicate the column number that the j-th entry of the third array M has had in the downmix matrix $M_{DMX}$. This column number (i.e. the j-th entry of the fourth array s) directly indicates the position of the corresponding entry in question within the first array (i.e. for column number m, the m-th entry of the first array corresponds to the entry in question of the third array M). Notably, the number of columns in the downmix matrix $M_{DMX}$ equals the number of entries of the first array.

At step S5050, it may be checked whether the number of determined products is less than the number of non-zero entries in the row of the downmix matrix $M_{DMX}$ indicated by the row index row. That is, the number of such products that have already been determined for the current value of the row index row may be compared to the number of non-zero entries in the current row of the downmix matrix $M_{DMX}$ (e.g., the row of the downmix matrix $M_{DMX}$ that is indicated by the row index row). If the number of such products is less than said number of non-zero entries determined at step S5030, the entry index j may be incremented by one at step S5060 and the method may return to step S5040.

On the other hand, if the number of such products is not less than said number of non-zero entries determined at step S5030, the method may proceed to step S5070. At step S5070, the products that have been determined for the current value of the row index row may be summed up and the resulting sum may be assigned to the entry of the second array that is indicated by the row index row. Alternatively, the products that have been determined for the current value of the row index row may be successively added to the entry in question of the second array, assuming that the entry in question of the second array has been initialized to zero beforehand. In the example of FIG. 4, $r_1$=2 products ($M_1 \cdot x_{s_1}$ and $M_2 \cdot x_{s_2}$) may be determined for row=1, and their sum may be assigned to the first entry $\bar{z}_1$ of the second array.

At step S5080 it may be checked whether all rows have been processed, i.e. if the row index row has reached the value $N_{out}$. If so, the method ends at step S5100. On the other hand, if not all rows have been processed, the row index row may be incremented by one at step S5090 and the method returns to step S5030.

Notably, steps S5010 to S5090 in the example of FIG. 5 may be performed for each frequency bin.

An example pseudo code (written in the C programming language) for implementing the above steps is now provided below:

```
// Assume appropriate type definitions, memory allocation,
// and initialization of z, M, x, and s, z.
// Representation of sparse matrix
sp = &s[0];          // Pointer increments (4th array)
Mp = &M[0];          // Non-zeros of sparse matrix (3rd
array)
rp = &r[0];          // Number of non-zeros in each row
                     // 5th-array)
// Input and output
xp = &x[0];                                  // Input (1st
array)
zp = &z[0];                                  // Output (2nd
array)
// Multiplication of sparse matrix by vector: z = Mdmx x
for (row = 0; row < Nout; row++) {           // Loop over rows of
M
    xp = &x[0];                              // Address of x
    *zp = 0;
    for (j = 0; j < *rp++; j++) {            // Loop over non-
zeros
                                             // of the row
        xp = *sp++;                          // Jump in x
        *zp += (*Mp++)*(*xp);
    }
    *zp++;
}
```

For the entries of the fourth array s indicating relative offsets between positions, the above line
  xp=*sp++; // Jump in x
in the exemplary code would need to be replaced by e.g.
  xp+=*sp++; // Jump in x Notably, the pseudo code assumes x and z to be real for illustrative purposes only, and it is understood that x and z typically may have complex entries. It is further understood that the exemplary code could be readily adapted to account also for complex entries of x and z.

In alternative embodiments, performing the actual downmix may involve, for each entry of the downmix matrix $M_{DMX}$, a determination as to whether or not the respective entry is zero. An actual multiplication of entries and assignment to a respective entry of the second array would only be performed in case that the entry in question of the downmix matrix is found to be non-zero. Exemplary code written in the C programming language for implementing the above approach is recited below:

```
// Type definitions.
float Mdmx[ ][ ], x[ ], z[ ];
int S[ ][ ];                      // Binary matrix to mark non-
zero
                                  //entries in Mdmx
int i, j;
// Assume here an appropriate memory allocation and
// initialization of the Nout by Nin matrices MDMX and S,
// and the Nin-vector x. The matrix S is initialized
// such that S[i][j] is zero if Mdmx[i][j] is zero and
// non-zero otherwise.
// Implement z = Mdmx x
for (i = 0; i < Nout; i++) {
    z[i] = 0.0;
    for (j = 0; j < Nin; j++) {
        if (S[i][j] == 0) {
            z[i] += Mdmx[i][j]*x[j];
        }
    }
}
```

Next, details of step S2040 in FIG. 2 will be described with reference to the exemplary flowchart illustrated in FIG. 6. That is, determining the first indication of energy of the respective intermediate audio channel may involve some or all of steps S6010 to S6030.

At step S6010, if not already determined earlier or otherwise at hand, the third array M may be determined. This determination may proceed as in step S3010 described above and any statements made with regard to step S3010 also apply here. At step S6020, if not already determined earlier or otherwise at hand, the fourth array s may be determined. This determination may proceed as in step S3020 described above and any statements made with regard to step S3020 also apply here. Although not shown in FIG. 6, step S2040 may further involve determining the fifth array r, if not already determined earlier or otherwise at hand. This determination may proceed as in step S2030 described above in the context of FIG. 3, and any statements made with regard to step S2030 apply also here.

At step S6030, powers (e.g., squares) of the entries of the third array M may be multiplied with powers of absolute values (e.g., absolute squares) of corresponding entries of the first array (e.g. for each frequency bin). By these multiplications, the actual determination of the first indication of energy for the intermediate audio channels may be performed, or at least part of this determination. That is, this determination may involve multiplying, for each frequency bin, powers (e.g., squares) of the entries of the third array M (e.g. for the respective frequency bin) with powers of absolute values (e.g., absolute squares) of corresponding entries of the first array (e.g. for the respective frequency bin) to obtain respective products of these entries. For the notion of corresponding entries in the first and third arrays, reference is made to the detailed description thereof given above.

Appropriate products of entries (squares of entries of the third array M multiplied with absolute squares of entries of the first array) may be summed up for each entry of the sixth array (for the respective frequency bin). The assignment of sums of (one or more) products to the entries of the sixth array may be performed on the basis of the fifth array r. Each entry of the fifth array r may indicate, for the respective entry of the sixth array, how many products need to be summed up and assigned to the respective entry of the sixth array. When starting from the first entry of the sixth array, consecutively assigning sums of the determined products, in the order in which these products are determined, to the entries of the sixth array, wherein the number of terms in each sum is determined by respective entries of the fifth array r, will then yield all entries of the sixth array and will thus yield first indications of energy for all intermediate audio channels. In general terms, determining the first indications of energy may further involve, for each frequency bin, assigning sums of one or more products of squares of the entries of the third array with absolute squares of the corresponding entries of the first array for the respective frequency bin to the entries of the sixth array on the basis of the entries of the fifth array. Notably, the fifth array r and the sixth array Z have dimension $N_{out}$ (e.g., each have $N_{out}$ entries).

In some example embodiments, the step of determining the first indications of energy may further involve successively incrementing the entry index to the sixth array by one at a time and determining, for each such entry index, a product of the square of the entry of the third array indicated by the respective entry index with the absolute square of the corresponding entry of the first array for the respective frequency bin. The corresponding entry of the first array may be determined by referring to the fourth array, as has been described above. For example, the column number of the entry in question may be determined by referring to the fourth array s. The entry of the first array that corresponds to the entry in question of the third array may then be determined as the entry of the first array that has the determined column number as its entry index. Determining the first indications of energy may further involve sequentially assigning sums of one or more of these products to the entries of the sixth array, wherein the assignment may be based on the entries of the fifth array. That is, the number of products in the sum that is to be assigned to an entry of the sixth array may be determined by the entry of the fifth array that has the same entry index as the entry in question of the sixth array. For successively determined products of squares of entries of the third array with absolute squares of corresponding entries of the first array, the determined products may be successively added to the entries of the sixth array in their order within the sixth array (assuming that the entries of the sixth array are initialized to zero beforehand), wherein the number of successively determined products that is to be added to each entry of the sixth array may be determined from the corresponding entry of the fifth array. Notably, these steps may be performed for each frequency bin. In order to obtain the first indication of energy for a given processing band, sixth arrays for the frequency bins within the given processing band may be summed (in accordance with the rules for vector addition). The first indication of energy associated with a given frequency band may be said to be the first indication of energy for each of the frequency bins within this processing band.

Figure 6:
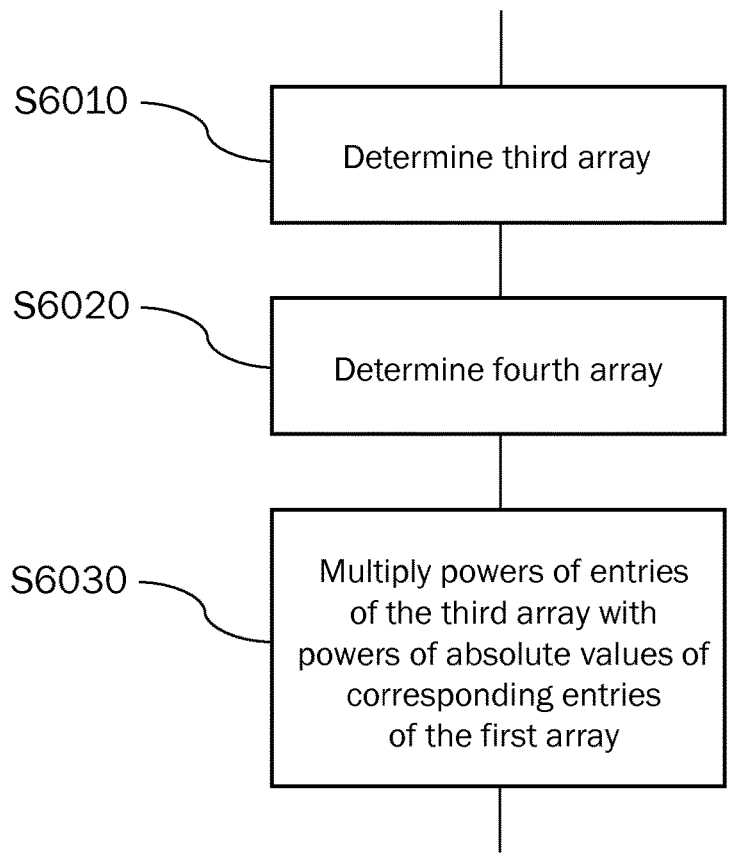
FIG. 6 is a flowchart schematically illustrating examples of details of another step in the process of FIG. 2 according to embodiments of the disclosure.
Figure 7:
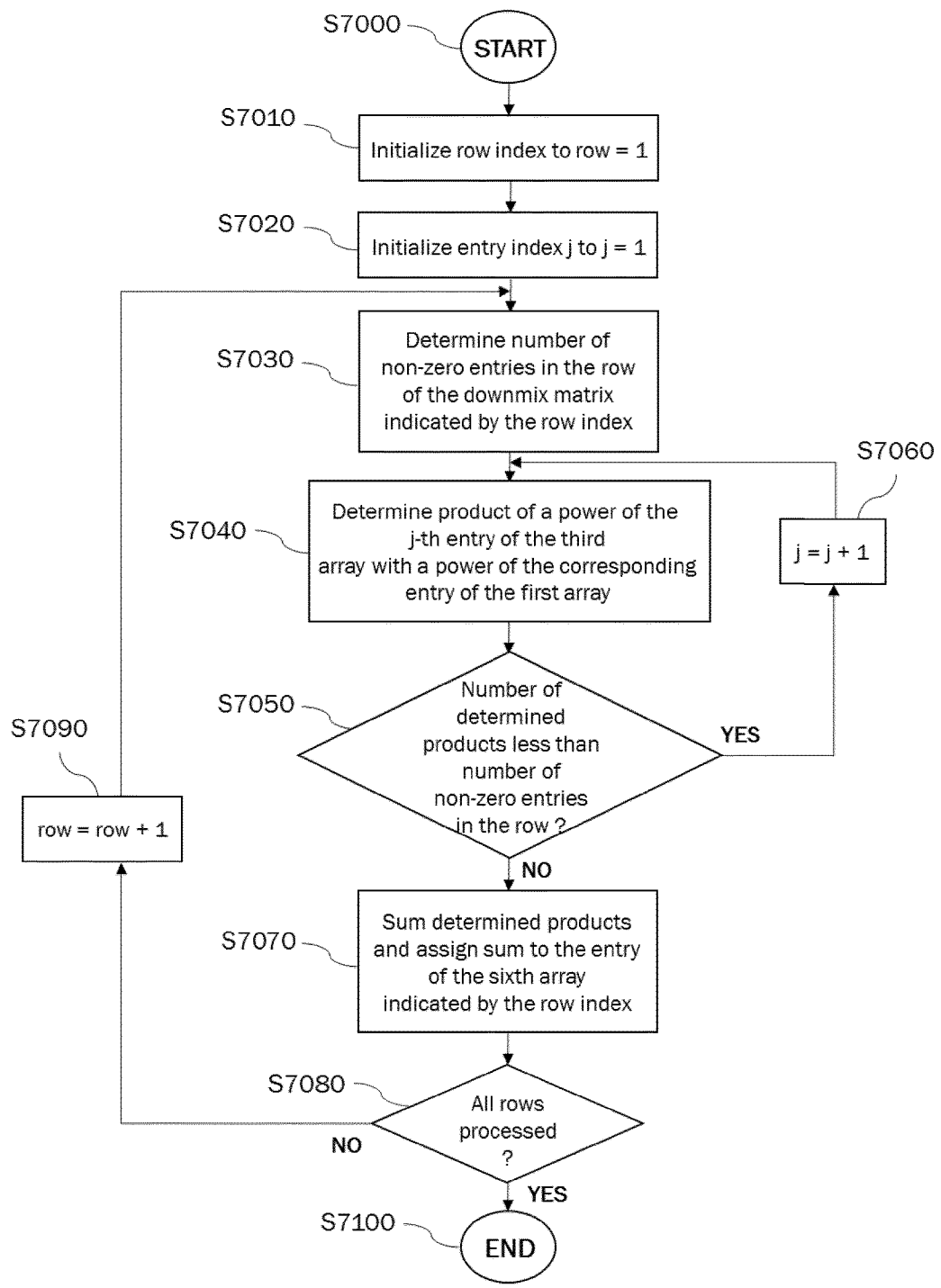
FIG. 7 is a flowchart schematically illustrating examples of details of a step in the process of FIG. 6.

FIG. 7 illustrates an example according to embodiments of the disclosure for determining the first indications of energy at step S6030 in FIG. 6. That is, determining the first indications of energy may involve some or all of steps S7010 to S7090. Notably, the example of FIG. 7 relates to the case of a row-wise scan order, but may be readily adapted to relate to the case of a column-wise scan order.

The method starts at step S7000. Step S7010, step S7020, and step S7030 may be identical to step S5010, step S5020 and step S5030 in FIG. 5, respectively, and repeated description thereof is omitted.

In case that the row of the downmix matrix $M_{DMX}$ that is indicated by the row index row does not contain any non-zero entries, the method may assign the (complex) value zero to the entry of the sixth array that is indicated by the row index row and skip steps S7040 to S7070.

Step S7040 may be identical to step S5040 in FIG. 5, except for that instead of the j-th entry of the third array M and the corresponding entry of the first array, now a power (e.g. the square) of the j-th entry of the third array M and a power of the absolute value (e.g. the absolute square) of the corresponding entry of the first array may be multiplied with each other in order to determine their product.

Step S7050 and step S7060 may be identical to step S5050 and step S5060 in FIG. 5, respectively, and repeated description thereof is omitted.

In step S7070, the sum resulting from summing up the products that have been determined for the current value of the row index row may be assigned to the entry of the sixth array that is indicated by the row index row. Alternatively, the products that have been determined for the current value of the row index row may be successively added to the entry in question of the sixth array, assuming that the entry in question of the sixth array has been initialized to zero beforehand. In the example of FIG. 4, $r_1=2$ products (($M_1$)

$^2 \cdot |x_{s_1}|^2$ and $(M_2)^2 \cdot |x_{s_2}|^2$) may be determined for row=1, and their sum may be assigned to the first entry $Z_1$ of the sixth array.

Step S7080 and step S7090 may be again identical to step S5080 and S5090 in FIG. 5, respectively, and repeated description thereof is omitted.

Notably, the processes of FIG. 5 and FIG. 7 could be combined into a single process in order to reduce the computational costs for looping and for addressing entries of the first and third arrays. A new, combined process (method) for performing the actual downmix and for determining the first indications of energy may have the same steps as the method in FIG. 5, with the exception of step S5040 and step S5070. These steps would be replaced by new steps S8040 and S8070, respectively. Notably, this combination implies that step S2030 and step S2040 may be performed jointly.

At step S8040, the combined processing of step S5040 and step S7040 may be performed. That is, a first product of the j-th entry of the third array with the corresponding entry of the first array may be obtained (in the manner described with reference to step S5040 above), and at the same time a second product of a power (e.g. the square) of the j-th entry of the third array with a power of the absolute value (e.g. the absolute square) of the corresponding entry of the first array may also be obtained (in the manner described with reference to step S7040 above). Notably, this would require swapping the order of the two summation processes in equation [4].

Then, at step S8070, the combined processing of step S5070 and step S7070 may be performed. That is, the first products that have been determined for the current value of the row index row may be summed up and the resulting sum may be assigned to the index of the second array that is indicated by the row index row. Alternatively, the first products that have been determined for the current value of the row index row may be successively added to the entry in question of the second array, assuming that the entry in question of the second array has been initialized to zero beforehand. Moreover, the second products that have been determined for the current value of the row index row may be summed up and the resulting sum may be assigned to the index of the sixth array that is indicated by the row index row. Alternatively, the second products that have been determined for the current value of the row index row may be successively added to the entry in question of the sixth array, assuming that the entry in question of the sixth array has been initialized to zero beforehand.

The above processing may be performed for each frequency bin. In order to obtain the first indications of energy per processing band instead of per frequency bin, respective sixth arrays for frequency bins within a given processing band may be summed up (according to the rules of vector addition).

Figure 8:
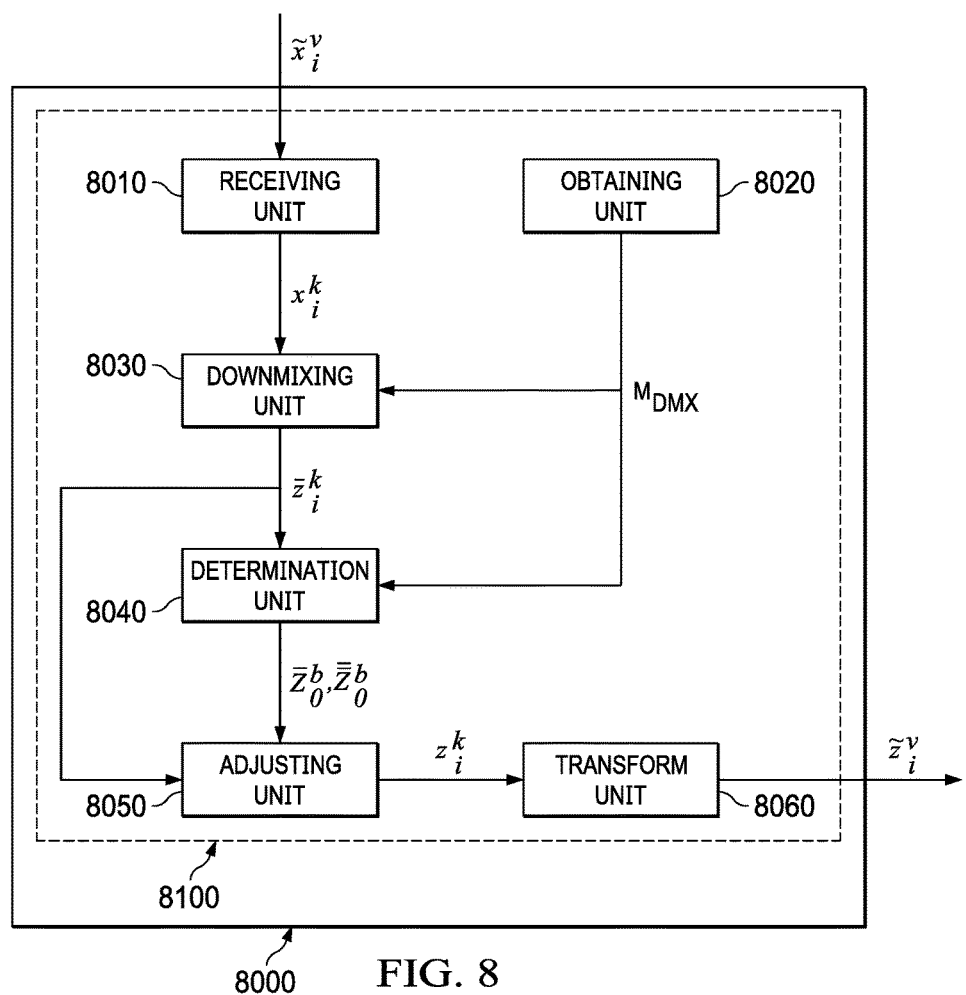
FIG. 8 schematically illustrates an apparatus according to embodiments of the disclosure for executing the process of FIG. 2.

It is understood that the proposed method for downmixing of a plurality of input audio channels may be implemented by an apparatus, for example by a format converter (format converter block) of an audio decoder, or in general, by an audio decoder. Such apparatus (e.g. format converter or audio decoder) may include respective units adapted to carry out respective steps described above. An example of such apparatus 8000 is schematically illustrated in FIG. 8. For instance, such apparatus 8000 may include a frequency coefficient obtaining unit 8010 (e.g. a receiving unit or a time-frequency transform unit) adapted to perform aforementioned step S2020, a downmix matrix obtaining unit 8020 adapted to perform aforementioned step S2010, a downmixing unit 8030 adapted to perform aforementioned step S2030, an energy determination unit 8040 adapted to perform aforementioned step S2040, an adjusting unit 8050 adapted to perform aforementioned step S2050, and/or an inverse time-frequency transform unit 8060 adapted to perform aforementioned step S2060. It is further understood that the respective units of such apparatus may be embodied by a processor 8100 of a computing device that is adapted to perform the processing carried out by each of said respective units, i.e. that is adapted to carry out each of the aforementioned steps.

In the above description of embodiments of the disclosure, the row index row and the entry index j are initialized to 1 and it is assumed that the first index in any given array has value 1, i.e. that an index value of 1 indicates the first entry of the array in question. However, the present disclosure is not to be construed as limited to this choice. Alternatively, these indices could also have an index value of 0. Thus, the value of 1 chosen above may be said to exemplarily represent the lowest possible index value.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically presence. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example, and if applicable to the particular claim element, a baseband integrated circuit or applications processor integrated circuit for a mobile phone or a similar integrated circuit in server, a cellular network device, or other network device (e.g., a user equipment (UE) such as a smart phone, a cellular phone, a personal digital assistant (PDA), a wireless modem, a wireless communication device, a laptop, a netbook, a tablet or any other device cable of communicating with an FirstNet, E-UTRAN, UTRAN or GERAN enabled device).

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods and apparatus described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and apparatus may be stored on media such as random access memory or optical storage media. They may be transferred via networks, such as radio networks, satellite networks, wireless networks or wireline networks (e.g. the Internet and/or an IP Multimedia Core Network Subsystem (IMS)).

Various modifications and adaptations to the foregoing example embodiments may become apparent to those skilled in the relevant arts in view of the foregoing description, when it is read in conjunction with the accompanying drawings. Any and all modifications will still fall within the scope of the non-limiting and example embodiments. Furthermore, other example embodiment category forth herein will come to mind to one skilled in the art to which these embodiments pertain having the benefit of the teachings presented in the foregoing descriptions and the drawings.

Accordingly, the present invention may be embodied in any of the forms described herein. For example, the following enumerated example embodiments (A-EEEs) describe some structures, features, and functionalities of some aspects of the present invention.

A-EEE 1. A method of downmixing a plurality of input audio channels, the method including obtaining, for each of the input audio channels, a plurality of frequency coefficients in a plurality of corresponding frequency bins and applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin, wherein the method further involves determining a third array including only the non-zero entries of the downmix matrix and determining a fourth array including, for each entry of the third array, an entry indicative of a position of the respective entry of the third array within the downmix matrix and wherein applying the downmix matrix to the first array involves multiplying, for the at least one frequency bin, the entries of the third array with corresponding entries of the first array for the respective frequency bin, the corresponding entries of said first array being determined on the basis of the fourth array.

A-EEE 2. The method according to A-EEE 1, wherein the method further includes determining, for the at least one frequency bin, for each intermediate audio channel, an indication of energy of the respective intermediate audio channel and wherein determining said indication of energy involves, for the at least one frequency bin multiplying powers of the entries of the third array with powers of absolute values of the corresponding entries of the first array, the corresponding entries of the first array being determined on the basis of the fourth array.

A-EEE 3. The method according to any one of the preceding A-EEEs, wherein the third array is a linear array including the non-zero entries of the downmix matrix in their order of occurrence in a predetermined scan order across the entries of the downmix matrix.

A-EEE 4. The method according to any one of the preceding A-EEEs, wherein each entry of the fourth array is indicative of the position of the respective entry of the third array within the downmix matrix in the scan order.

A-EEE 5. The method according to any one of the preceding A-EEEs, wherein each entry of the fourth array indicates the column of the downmix matrix in which the respective entry of the third array is located in the downmix matrix for a row-wise scan order, or the row of the downmix matrix in which the respective entry of the third array is located in the downmix matrix for a column-wise scan order.

A-EEE 6. The method according to A-EEE 3 or any one of the preceding A-EEEs in their dependence on A-EEE 3, further including determining a fifth array, the entries of which indicate the number of non-zero entries per respective row of the downmix matrix for a row-wise scan order or the number of non-zero entries per respective column of the downmix matrix for a column-wise scan order.

A-EEE 7. The method according to A-EEE 6, wherein applying the downmix matrix to the first array further involves, for the at least one frequency bin assigning sums of one or more products of the entries of the third array with the corresponding entries of the first array for the respective frequency bin to the entries of the second array on the basis of the entries of the fifth array.

A-EEE 8. The method according to A-EEE 5 or 6, wherein applying the downmix matrix to the first array further involves, for the at least one frequency bin successively incrementing the entry index to the third array by one at a time and determining, for each such entry index, a product of the entry of the third array indicated by the respective entry index with the corresponding entry of the first array for the respective frequency bin and sequentially assigning sums of one or more of these products to the entries of the second array, wherein the assignment is based on the entries of the fifth array.

A-EEE 9. The method according to A-EEE 8, wherein applying the downmix matrix to the first array further involves, for the at least one frequency bin for each entry index to the third array, determining, as a second product, a product of the square of the entry of the third array indicated by the respective entry index with the absolute square of the corresponding entry of the first array for the respective frequency bin and sequentially assigning sums of one or more of these second products to the entries of a sixth array for the respective frequency bin, wherein the assignment is based on the entries of the fifth array, and wherein a sum of the sixth arrays over frequency bins within a given processing band yield the indication of energy for the frequency bins within said given processing band.

A-EEE 10. The method according to A-EEE 9, wherein determining the frequency bins within the given processing band involves referring to a lookup table, wherein the lookup table comprises, for each processing band, an entry indicating the number of frequency bins within the respective processing band.

A-EEE 11. An apparatus for downmixing a plurality of input audio channels, the apparatus including a frequency coefficient obtaining unit adapted to obtain, for each of the input audio channels, a plurality of frequency coefficients in a plurality of corresponding frequency bins a downmix matrix obtaining unit adapted to obtaining a downmix matrix, a downmixing unit adapted to apply, for at least one frequency bin, the downmix matrix to a first array formed by the frequency coefficients of the plurality of input audio channels for the respective frequency bin to obtain a second array formed by the frequency coefficients of a plurality of intermediate audio channels for the respective frequency bin, wherein the downmixing unit is adapted to determine a third array including only the non-zero entries of the downmix matrix determine a fourth array including, for each entry of the third array, an entry indicative of a position of the respective entry of the third array in the downmix matrix and multiply, for the at least one frequency bin, the entries of the third array with corresponding entries of the first array for the respective frequency bin, the corresponding entries of said first array being determined on the basis of the fourth array.

A-EEE 12. The apparatus according to A-EEE 11, wherein the third array is a linear array including the non-zero entries of the downmix matrix in their order of occurrence in a predetermined scan order across the entries of the downmix matrix.

A-EEE 13. The apparatus according to A-EEE 12, wherein the downmixing unit is further adapted to determine a fifth array, the entries of which indicate the number of non-zero entries per respective row of the downmix matrix for a row-wise scan order or the number of non-zero entries of the downmix matrix per respective column for a column-wise scan order.

A-EEE 14. The apparatus according to A-EEE 13, wherein the downmixing unit is further adapted to, for the at least one frequency bin assign sums of one or more products of the entries of the third array with the corresponding entries of the first array for the respective frequency bin to the entries of the second array on the basis of the entries of the fifth array.

A-EEE 15. A software program adapted for execution on a processor and for performing the method steps of the method according to any one of A-EEEs 1 to 10 when carried out on a computing device.

By way of further example, the following enumerated example embodiments (B-EEEs) describe some structures, features, and functionalities of some aspects of the present invention.

B-EEE 1. A method of downmixing a plurality of input audio channels, the method including obtaining, for each of the input audio channels, a plurality of frequency coefficients in a plurality of corresponding frequency bins and applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin, wherein the method further involves determining a third array including only the non-zero entries of the downmix matrix and determining a fourth array including, for each entry of the third array, an entry indicative of a position of the respective entry of the third array within the downmix matrix and wherein applying the downmix matrix to the first array involves multiplying, for the at least one frequency bin, the entries of the third array with corresponding entries of the first array for the respective frequency bin, the corresponding entries of said first array being determined on the basis of the fourth array.

B-EEE 2. The method according to B-EEE 1, wherein the method further includes determining, for the at least one frequency bin, for each intermediate audio channel, an indication of energy of the respective intermediate audio channel and wherein determining said indication of energy involves, for the at least one frequency bin multiplying powers of the entries of the third array with powers of absolute values of the corresponding entries of the first array, the corresponding entries of the first array being determined on the basis of the fourth array.

B-EEE 3. The method according to any one of the preceding B-EEEs, wherein the third array is a linear array including the non-zero entries of the downmix matrix in their order of occurrence in a predetermined scan order across the entries of the downmix matrix.

B-EEE 4. The method according to any one of the preceding B-EEEs, wherein each entry of the fourth array is indicative of the position of the respective entry of the third array within the downmix matrix in the scan order.

B-EEE 5. The method according to any one of the preceding B-EEEs, wherein each entry of the fourth array indicates the column of the downmix matrix in which the respective entry of the third array is located in the downmix matrix for a row-wise scan order, or the row of the downmix matrix in which the respective entry of the third array is located in the downmix matrix for a column-wise scan order.

B-EEE 6. The method according to B-EEE 3 or any one of the preceding B-EEEs in their dependence on B-EEE 3, further including determining a fifth array, the entries of which indicate the number of non-zero entries per respective row of the downmix matrix for a row-wise scan order or the number of non-zero entries per respective column of the downmix matrix for a column-wise scan order.

B-EEE 7. The method according to B-EEE 6, wherein applying the downmix matrix to the first array further involves, for the at least one frequency bin assigning sums of one or more products of the entries of the third array with the corresponding entries of the first array for the respective frequency bin to the entries of the second array on the basis of the entries of the fifth array.

B-EEE 8. The method according to B-EEE 5 or 6, wherein applying the downmix matrix to the first array further involves, for the at least one frequency bin successively incrementing the entry index to the third array by one at a time and determining, for each such entry index, a product of the entry of the third array indicated by the respective entry index with the corresponding entry of the first array for the respective frequency bin and sequentially assigning sums of one or more of these products to the entries of the second array, wherein the assignment is based on the entries of the fifth array.

B-EEE 9. The method according to B-EEE 8, wherein applying the downmix matrix to the first array further involves, for the at least one frequency bin for each entry index to the third array, determining, as a second product, a product of the square of the entry of the third array indicated by the respective entry index with the absolute square of the corresponding entry of the first array for the respective frequency bin and sequentially assigning sums of one or more of these second products to the entries of a sixth array for the respective frequency bin, wherein the assignment is based on the entries of the fifth array, and wherein a sum of the sixth arrays over frequency bins within a given processing band yield the indication of energy for the frequency bins within said given processing band.

B-EEE 10. The method according to B-EEE 9, wherein determining the frequency bins within the given processing band involves referring to a lookup table, wherein the lookup table comprises, for each processing band, an entry indicating the number of frequency bins within the respective processing band.

B-EEE 11. An apparatus for downmixing a plurality of input audio channels, the apparatus including a frequency coefficient obtaining unit adapted to obtain, for each of the input audio channels, a plurality of frequency coefficients in a plurality of corresponding frequency bins a downmix matrix obtaining unit adapted to obtaining a downmix matrix a downmixing unit adapted to apply, for at least one frequency bin, the downmix matrix to a first array formed by the frequency coefficients of the plurality of input audio channels for the respective frequency bin to obtain a second array formed by the frequency coefficients of a plurality of intermediate audio channels for the respective frequency bin, wherein the downmixing unit is adapted to determine a third array including only the non-zero entries of the downmix matrix determine a fourth array including, for each entry of the third array, an entry indicative of a position of the respective entry of the third array in the downmix matrix; and multiply, for the at least one frequency bin, the entries of the third array with corresponding entries of the first array for the respective frequency bin, the corresponding entries of said first array being determined on the basis of the fourth array.

B-EEE 12. The apparatus according to B-EEE 11, wherein the third array is a linear array including the non-zero entries of the downmix matrix in their order of occurrence in a predetermined scan order across the entries of the downmix matrix.

B-EEE 13. The apparatus according to B-EEE 12, wherein the downmixing unit is further adapted to determine a fifth array, the entries of which indicate the number of non-zero entries per respective row of the downmix matrix for a row-wise scan order or the number of non-zero entries of the downmix matrix per respective column for a column-wise scan order.

B-EEE 14. The apparatus according to B-EEE 13, wherein the downmixing unit is further adapted to, for the at least one frequency bin assign sums of one or more products of the entries of the third array with the corresponding entries of the first array for the respective frequency bin to the entries of the second array on the basis of the entries of the fifth array.

B-EEE 15. A software program adapted for execution on a processor and for performing the method steps of the method according to any one of B-EEEs 1 to 10 when carried out on a computing device.

By way of further example, the following enumerated example embodiments (C-EEEs) describe some structures, features, and functionalities of some aspects of the present invention.

C-EEE 1. A method of downmixing a plurality of input audio channels, the method including obtaining, for each of the input audio channels, a plurality of frequency coefficients in a plurality of corresponding frequency bins and applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin, wherein the method further involves determining a third array including only the non-zero entries of the downmix matrix and determining a fourth array including, for each entry of the third array, an entry indicative of a position of the respective entry of the third array within the downmix matrix and wherein applying the downmix matrix to the first array involves multiplying, for the at least one frequency bin, the entries of the third array with corresponding entries of the first array for the respective frequency bin, the corresponding entries of said first array being determined on the basis of the fourth array.

C-EEE 2. The method according to C-EEE 1, wherein the method further includes determining, for the at least one frequency bin, for each intermediate audio channel, an indication of energy of the respective intermediate audio channel and wherein determining said indication of energy involves, for the at least one frequency bin multiplying powers of the entries of the third array with powers of absolute values of the corresponding entries of the first array, the corresponding entries of the first array being determined on the basis of the fourth array.

C-EEE 3. The method according to any one of the preceding C-EEEs, wherein the third array is a linear array including the non-zero entries of the downmix matrix in their order of occurrence in a predetermined scan order across the entries of the downmix matrix.

C-EEE 4. The method according to any one of the preceding C-EEEs, wherein each entry of the fourth array is indicative of the position of the respective entry of the third array within the downmix matrix in the scan order.

C-EEE 5. The method according to any one of the preceding C-EEEs, wherein each entry of the fourth array indicates the column of the downmix matrix in which the respective entry of the third array is located in the downmix matrix for a row-wise scan order, or the row of the downmix matrix in which the respective entry of the third array is located in the downmix matrix for a column-wise scan order.

C-EEE 6. The method according to C-EEE 3 or any one of the preceding C-EEEs in their dependence on C-EEE 3, further including determining a fifth array, the entries of which indicate the number of non-zero entries per respective row of the downmix matrix for a row-wise scan order or the number of non-zero entries per respective column of the downmix matrix for a column-wise scan order.

C-EEE 7. The method according to C-EEE 6, wherein applying the downmix matrix to the first array further involves, for the at least one frequency bin assigning sums of one or more products of the entries of the third array with the corresponding entries of the first array for the respective frequency bin to the entries of the second array on the basis of the entries of the fifth array.

C-EEE 8. The method according to C-EEE 5 or 6, wherein applying the downmix matrix to the first array further involves, for the at least one frequency bin successively incrementing the entry index to the third array by one at a time and determining, for each such entry index, a product of the entry of the third array indicated by the respective entry index with the corresponding entry of the first array for the respective frequency bin and sequentially assigning sums of one or more of these products to the entries of the second array, wherein the assignment is based on the entries of the fifth array.

C-EEE 9. The method according to C-EEE 8, wherein applying the downmix matrix to the first array further involves, for the at least one frequency bin for each entry index to the third array, determining, as a second product, a product of the square of the entry of the third array indicated by the respective entry index with the absolute square of the corresponding entry of the first array for the respective frequency bin and sequentially assigning sums of one or more of these second products to the entries of a sixth array for the respective frequency bin, wherein the assignment is based on the entries of the fifth array, and wherein a sum of the sixth arrays over frequency bins within a given processing band yield the indication of energy for the frequency bins within said given processing band.

C-EEE 10. The method according to C-EEE 9, wherein determining the frequency bins within the given processing band involves referring to a lookup table, wherein the lookup table comprises, for each processing band, an entry indicating the number of frequency bins within the respective processing band.

C-EEE 11. An apparatus for downmixing a plurality of input audio channels, the apparatus including a frequency coefficient obtaining unit adapted to obtain, for each of the input audio channels, a plurality of frequency coefficients in a plurality of corresponding frequency bins a downmix matrix obtaining unit adapted to obtaining a downmix matrix, a downmixing unit adapted to apply, for at least one frequency bin, the downmix matrix to a first array formed by the frequency coefficients of the plurality of input audio channels for the respective frequency bin to obtain a second array formed by the frequency coefficients of a plurality of intermediate audio channels for the respective frequency bin, wherein the downmixing unit is adapted to determine a third array including only the non-zero entries of the downmix matrix determine a fourth array including, for each entry of the third array, an entry indicative of a position of the respective entry of the third array in the downmix matrix and multiply, for the at least one frequency bin, the entries of the third array with corresponding entries of the first array for the respective frequency bin, the corresponding entries of said first array being determined on the basis of the fourth array.

C-EEE 12. The apparatus according to C-EEE 11, wherein the third array is a linear array including the non-zero entries of the downmix matrix in their order of occurrence in a predetermined scan order across the entries of the downmix matrix.

C-EEE 13. The apparatus according to C-EEE 12, wherein the downmixing unit is further adapted to determine a fifth array, the entries of which indicate the number of non-zero entries per respective row of the downmix matrix for a row-wise scan order or the number of non-zero entries of the downmix matrix per respective column for a column-wise scan order.

C-EEE 14. The apparatus according to C-EEE 13, wherein the downmixing unit is further adapted to, for the at least one frequency bin assign sums of one or more products of the entries of the third array with the corresponding entries of the first array for the respective frequency bin to the entries of the second array on the basis of the entries of the fifth array.

C-EEE 15. A software program adapted for execution on a processor and for performing the method steps of the method according to any one of C-EEEs 1 to 10 when carried out on a computing device.

By way of further example, the following enumerated example embodiments (D-EEEs) describe some structures, features, and functionalities of some aspects of the present invention.

D-EEE 1. A method of downmixing a plurality of input audio channels, the method including obtaining, for each of the input audio channels, a plurality of frequency coefficients in a plurality of corresponding frequency bins and applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin, wherein the method further involves determining a third array including only the non-zero entries of the downmix matrix and determining a fourth array including, for each entry of the third array, an entry indicative of a position of the respective entry of the third array within the downmix matrix and wherein applying the downmix matrix to the first array involves multiplying, for the at least one frequency bin, the entries of the third array with corresponding entries of the first array for the respective frequency bin, the corresponding entries of said first array being determined on the basis of the fourth array.

D-EEE 2. The method according to D-EEE 1, wherein the method further includes determining, for the at least one frequency bin, for each intermediate audio channel, an indication of energy of the respective intermediate audio channel and wherein determining said indication of energy involves, for the at least one frequency bin multiplying powers of the entries of the third array with powers of absolute values of the corresponding entries of the first array, the corresponding entries of the first array being determined on the basis of the fourth array.

D-EEE 3. The method according to any one of the preceding D-EEEs, wherein the third array is a linear array including the non-zero entries of the downmix matrix in their order of occurrence in a predetermined scan order across the entries of the downmix matrix.

D-EEE 4. The method according to any one of the preceding D-EEEs, wherein each entry of the fourth array is indicative of the position of the respective entry of the third array within the downmix matrix in the scan order.

D-EEE 5. The method according to any one of the preceding D-EEEs, wherein each entry of the fourth array indicates the column of the downmix matrix in which the respective entry of the third array is located in the downmix matrix for a row-wise scan order, or the row of the downmix matrix in which the respective entry of the third array is located in the downmix matrix for a column-wise scan order.

D-EEE 6. The method according to D-EEE 3 or any one of the preceding D-EEEs in their dependence on D-EEE 3, further including determining a fifth array, the entries of which indicate the number of non-zero entries per respective row of the downmix matrix for a row-wise scan order or the number of non-zero entries per respective column of the downmix matrix for a column-wise scan order.

D-EEE 7. The method according to D-EEE 6, wherein applying the downmix matrix to the first array further involves, for the at least one frequency bin assigning sums of one or more products of the entries of the third array with the corresponding entries of the first array for the respective frequency bin to the entries of the second array on the basis of the entries of the fifth array.

D-EEE 8. The method according to D-EEE 5 or 6, wherein applying the downmix matrix to the first array further involves, for the at least one frequency bin successively incrementing the entry index to the third array by one at a time and determining, for each such entry index, a product of the entry of the third array indicated by the respective entry index with the corresponding entry of the first array for the respective frequency bin and sequentially assigning sums of one or more of these products to the entries of the second array, wherein the assignment is based on the entries of the fifth array.

D-EEE 9. The method according to D-EEE 8, wherein applying the downmix matrix to the first array further involves, for the at least one frequency bin for each entry index to the third array, determining, as a second product, a product of the square of the entry of the third array indicated by the respective entry index with the absolute square of the corresponding entry of the first array for the respective frequency bin and sequentially assigning sums of one or more of these second products to the entries of a sixth array for the respective frequency bin, wherein the assignment is based on the entries of the fifth array, and wherein a sum of the sixth arrays over frequency bins within a given processing band yield the indication of energy for the frequency bins within said given processing band.

D-EEE 10. The method according to D-EEE 9, wherein determining the frequency bins within the given processing band involves referring to a lookup table, wherein the lookup table comprises, for each processing band, an entry indicating the number of frequency bins within the respective processing band.

D-EEE 11. An apparatus for downmixing a plurality of input audio channels, the apparatus including a frequency coefficient obtaining unit adapted to obtain, for each of the input audio channels, a plurality of frequency coefficients in a plurality of corresponding frequency bins a downmix matrix obtaining unit adapted to obtaining a downmix matrix, a downmixing unit adapted to apply, for at least one frequency bin, the downmix matrix to a first array formed by the frequency coefficients of the plurality of input audio channels for the respective frequency bin to obtain a second array formed by the frequency coefficients of a plurality of intermediate audio channels for the respective frequency bin, wherein the downmixing unit is adapted to determine a third array including only the non-zero entries of the downmix matrix determine a fourth array including, for each entry of the third array, an entry indicative of a position of the respective entry of the third array in the downmix matrix and multiply, for the at least one frequency bin, the entries of the third array with corresponding entries of the first array for the respective frequency bin, the corresponding entries of said first array being determined on the basis of the fourth array.

D-EEE 12. The apparatus according to D-EEE 11, wherein the third array is a linear array including the non-zero entries of the downmix matrix in their order of occurrence in a predetermined scan order across the entries of the downmix matrix.

D-EEE 13. The apparatus according to D-EEE 12, wherein the downmixing unit is further adapted to determine a fifth array, the entries of which indicate the number of non-zero entries per respective row of the downmix matrix for a row-wise scan order or the number of non-zero entries of the downmix matrix per respective column for a column-wise scan order.

D-EEE 14. The apparatus according to D-EEE 13, wherein the downmixing unit is further adapted to, for the at least one frequency bin assign sums of one or more products of the entries of the third array with the corresponding entries of the first array for the respective frequency bin to the entries of the second array on the basis of the entries of the fifth array.

D-EEE 15. A software program adapted for execution on a processor and for performing the method steps of the method according to any one of D-EEEs 1 to 10 when carried out on a computing device.

By way of further example, the following enumerated example embodiments (E-EEEs) describe some structures, features, and functionalities of some aspects of the present invention.

E-EEE 1. A method of downmixing a plurality of input audio channels, the method including obtaining, for each of the input audio channels, a plurality of frequency coefficients in a plurality of corresponding frequency bins and applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin, wherein the method further involves determining a third array including only the non-zero entries of the downmix matrix and determining a fourth array including, for each entry of the third array, an entry indicative of a position of the respective entry of the third array within the downmix matrix and wherein applying the downmix matrix to the first array involves multiplying, for the at least one frequency bin, the entries of the third array with corresponding entries of the first array for the respective frequency bin, the corresponding entries of said first array being determined on the basis of the fourth array.

E-EEE 2. The method according to E-EEE 1, wherein the method further includes determining, for the at least one frequency bin, for each intermediate audio channel, an indication of energy of the respective intermediate audio channel and wherein determining said indication of energy involves, for the at least one frequency bin multiplying powers of the entries of the third array with powers of absolute values of the corresponding entries of the first array, the corresponding entries of the first array being determined on the basis of the fourth array.

E-EEE 3. The method according to any one of the preceding E-EEEs, wherein the third array is a linear array including the non-zero entries of the downmix matrix in their order of occurrence in a predetermined scan order across the entries of the downmix matrix.

E-EEE 4. The method according to any one of the preceding E-EEEs, wherein each entry of the fourth array is indicative of the position of the respective entry of the third array within the downmix matrix in the scan order.

E-EEE 5. The method according to any one of the preceding E-EEEs, wherein each entry of the fourth array indicates the column of the downmix matrix in which the respective entry of the third array is located in the downmix matrix for a row-wise scan order, or the row of the downmix matrix in which the respective entry of the third array is located in the downmix matrix for a column-wise scan order.

E-EEE 6. The method according to E-EEE 3 or any one of the preceding EEEs in their dependence on E-EEE 3, further including determining a fifth array, the entries of which indicate the number of non-zero entries per respective row of the downmix matrix for a row-wise scan order or the number of non-zero entries per respective column of the downmix matrix for a column-wise scan order.

E-EEE 7. The method according to E-EEE 6, wherein applying the downmix matrix to the first array further involves, for the at least one frequency bin assigning sums of one or more products of the entries of the third array with the corresponding entries of the first array for the respective frequency bin to the entries of the second array on the basis of the entries of the fifth array.

E-EEE 8. The method according to E-EEE 5 or 6, wherein applying the downmix matrix to the first array further involves, for the at least one frequency bin successively incrementing the entry index to the third array by one at a time and determining, for each such entry index, a product of the entry of the third array indicated by the respective entry index with the corresponding entry of the first array for the respective frequency bin and sequentially assigning sums of one or more of these products to the entries of the second array, wherein the assignment is based on the entries of the fifth array.

E-EEE 9. The method according to E-EEE 8, wherein applying the downmix matrix to the first array further involves, for the at least one frequency bin for each entry index to the third array, determining, as a second product, a product of the square of the entry of the third array indicated by the respective entry index with the absolute square of the corresponding entry of the first array for the respective frequency bin and sequentially assigning sums of one or more of these second products to the entries of a sixth array for the respective frequency bin, wherein the assignment is based on the entries of the fifth array, and wherein a sum of the sixth arrays over frequency bins within a given processing band yield the indication of energy for the frequency bins within said given processing band.

E-EEE 10. The method according to E-EEE 9, wherein determining the frequency bins within the given processing band involves referring to a lookup table, wherein the lookup table comprises, for each processing band, an entry indicating the number of frequency bins within the respective processing band.

E-EEE 11. An apparatus for downmixing a plurality of input audio channels, the apparatus including a frequency coefficient obtaining unit adapted to obtain, for each of the input audio channels, a plurality of frequency coefficients in a plurality of corresponding frequency bins a downmix matrix obtaining unit adapted to obtaining a downmix matrix, a downmixing unit adapted to apply, for at least one frequency bin, the downmix matrix to a first array formed by the frequency coefficients of the plurality of input audio channels for the respective frequency bin to obtain a second array formed by the frequency coefficients of a plurality of intermediate audio channels for the respective frequency bin, wherein the downmixing unit is adapted to determine a third array including only the non-zero entries of the downmix matrix determine a fourth array including, for each entry of the third array, an entry indicative of a position of the respective entry of the third array in the downmix matrix and multiply, for the at least one frequency bin, the entries of the third array with corresponding entries of the first array for the respective frequency bin, the corresponding entries of said first array being determined on the basis of the fourth array.

E-EEE 12. The apparatus according to E-EEE 11, wherein the third array is a linear array including the non-zero entries of the downmix matrix in their order of occurrence in a predetermined scan order across the entries of the downmix matrix.

E-EEE 13. The apparatus according to E-EEE 12, wherein the downmixing unit is further adapted to determine a fifth array, the entries of which indicate the number of non-zero entries per respective row of the downmix matrix for a row-wise scan order or the number of non-zero entries of the downmix matrix per respective column for a column-wise scan order.

E-EEE 14. The apparatus according to E-EEE 13, wherein the downmixing unit is further adapted to, for the at least one frequency bin assign sums of one or more products of the entries of the third array with the corresponding entries of the first array for the respective frequency bin to the entries of the second array on the basis of the entries of the fifth array.

E-EEE 15. A software program adapted for execution on a processor and for performing the method steps of the method according to any one of E-EEEs 1 to 10 when carried out on a computing device.

The invention claimed is:

1. A method of downmixing a plurality of input audio channels, the method comprising:
   obtaining, for each of the input audio channels, a plurality of frequency coefficients in a plurality of corresponding frequency bins; and
   applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin,
   wherein the method further involves:
   determining a third array including only the non-zero entries of the downmix matrix; and
   determining a fourth array including, for each entry of the third array, an entry indicative of a position of the respective entry of the third array within the downmix matrix; and
   wherein applying the downmix matrix to the first array involves:
   multiplying, for the at least one frequency bin, the entries of the third array with corresponding entries of the first array for the respective frequency bin, the corresponding entries of said first array being determined on the basis of the fourth array.

2. The method according to claim 1, wherein the method further comprises:
   determining, for the at least one frequency bin, for each intermediate audio channel, an indication of energy of the respective intermediate audio channel; and
   wherein determining said indication of energy involves, for the at least one frequency bin:
   multiplying powers of the entries of the third array with powers of absolute values of the corresponding entries of the first array, the corresponding entries of the first array being determined on the basis of the fourth array.

3. The method according to claim 1,
   wherein the third array is a linear array including the non-zero entries of the downmix matrix in their order of occurrence in a predetermined scan order across the entries of the downmix matrix.

4. The method according to claim 1,
   wherein each entry of the fourth array is indicative of the position of the respective entry of the third array within the downmix matrix in the scan order.

5. The method according to claim 1,
   wherein each entry of the fourth array indicates the column of the downmix matrix in which the respective entry of the third array is located in the downmix matrix for a row-wise scan order, or the row of the downmix matrix in which the respective entry of the third array is located in the downmix matrix for a column-wise scan order.

6. The method according to claim 3, further comprising:
   determining a fifth array, the entries of which indicate the number of non-zero entries per respective row of the downmix matrix for a row-wise scan order or the number of non-zero entries per respective column of the downmix matrix for a column-wise scan order.

7. The method according to claim 6, wherein applying the downmix matrix to the first array further involves, for the at least one frequency bin:
   assigning sums of one or more products of the entries of the third array with the corresponding entries of the first array for the respective frequency bin to the entries of the second array on the basis of the entries of the fifth array.

8. The method according to claim 5, wherein applying the downmix matrix to the first array further involves, for the at least one frequency bin:
   successively incrementing the entry index to the third array by one at a time and determining, for each such entry index, a product of the entry of the third array indicated by the respective entry index with the corresponding entry of the first array for the respective frequency bin; and
   sequentially assigning sums of one or more of these products to the entries of the second array, wherein the assignment is based on the entries of the fifth array.

9. The method according to claim 8, wherein applying the downmix matrix to the first array further involves, for the at least one frequency bin:
- for each entry index to the third array, determining, as a second product, a product of the square of the entry of the third array indicated by the respective entry index with the absolute square of the corresponding entry of the first array for the respective frequency bin; and
- sequentially assigning sums of one or more of these second products to the entries of a sixth array for the respective frequency bin, wherein the assignment is based on the entries of the fifth array, and wherein a sum of the sixth arrays over frequency bins within a given processing band yield the indication of energy for the frequency bins within said given processing band.

10. The method according to claim 9, wherein determining the frequency bins within the given processing band involves referring to a lookup table, wherein the lookup table comprises, for each processing band, an entry indicating the number of frequency bins within the respective processing band.

11. An apparatus for downmixing a plurality of input audio channels, the apparatus comprising:
- a frequency coefficient obtaining unit configured to obtain, for each of the input audio channels, a plurality of frequency coefficients in a plurality of corresponding frequency bins;
- a downmix matrix obtaining unit configured to obtain a downmix matrix;
- a downmixing unit configured to apply, for at least one frequency bin, the downmix matrix to a first array formed by the frequency coefficients of the plurality of input audio channels for the respective frequency bin to obtain a second array formed by the frequency coefficients of a plurality of intermediate audio channels for the respective frequency bin,
- wherein the downmixing unit is configured to: determine a third array including only the non-zero entries of the downmix matrix; determine a fourth array including, for each entry of the third array, an entry indicative of a position of the respective entry of the third array in the downmix matrix; and multiply, for the at least one frequency bin, the entries of the third array with corresponding entries of the first array for the respective frequency bin, the corresponding entries of said first array being determined on the basis of the fourth array.

12. The apparatus according to claim 11,
- wherein the third array is a linear array including the non-zero entries of the downmix matrix in their order of occurrence in a predetermined scan order across the entries of the downmix matrix.

13. The apparatus according to claim 12, wherein the downmixing unit is further configured to:
- determine a fifth array, the entries of which indicate the number of non-zero entries per respective row of the downmix matrix for a row-wise scan order or the number of non-zero entries of the downmix matrix per respective column for a column-wise scan order.

14. The apparatus according to claim 13, wherein the downmixing unit is further configured to, for the at least one frequency bin:
- assign sums of one or more products of the entries of the third array with the corresponding entries of the first array for the respective frequency bin to the entries of the second array on the basis of the entries of the fifth array.

15. A program storage device readable by a machine, tangibly embodying a program of instructions executable by the machine for causing performance of operations, said operations comprising:
- obtaining, for each of the input audio channels, a plurality of frequency coefficients in a plurality of corresponding frequency bins; and
- applying, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin,
- wherein said operations further involve:
- determining a third array including only the non-zero entries of the downmix matrix; and
- determining a fourth array including, for each entry of the third array, an entry indicative of a position of the respective entry of the third array within the downmix matrix; and
- wherein applying the downmix matrix to the first array involves:
- multiplying, for the at least one frequency bin, the entries of the third array with corresponding entries of the first array for the respective frequency bin, the corresponding entries of said first array being determined on the basis of the fourth array.

16. An apparatus, comprising:
- at least one processor; and
- at least one memory storing a computer program;
- in which the at least one memory with the computer program is configured with the at least one processor to cause the apparatus to at least:
- obtain, for each of the input audio channels, a plurality of frequency coefficients in a plurality of corresponding frequency bins; and
- apply, for at least one frequency bin, a downmix matrix to a first array formed by the frequency coefficients of the plurality of input audio channels for the respective frequency bin to obtain a second array formed by the frequency coefficients of a plurality of intermediate audio channels for the respective frequency bin,
- wherein the apparatus is further configured to:
- determine a third array including only the non-zero entries of the downmix matrix; and
- determine a fourth array including, for each entry of the third array, an entry indicative of a position of the respective entry of the third array within the downmix matrix; and
- wherein applying the downmix matrix to the first array involves:
- multiplying, for the at least one frequency bin, the entries of the third array with corresponding entries of the first array for the respective frequency bin, the corresponding entries of said first array being determined on the basis of the fourth array.

17. The apparatus according to claim 16, wherein the apparatus is further configured to:
- determine, for the at least one frequency bin, for each intermediate audio channel, an indication of energy of the respective intermediate audio channel; and
- wherein determining said indication of energy involves, for the at least one frequency bin:
- multiplying powers of the entries of the third array with powers of absolute values of the corresponding entries of the first array, the corresponding entries of the first array being determined on the basis of the fourth array.

18. The apparatus according to claim 16, wherein the third array is a linear array including the non-zero entries of the downmix matrix in their order of occurrence in a predetermined scan order across the entries of the downmix matrix.

19. The apparatus according to claim 16, wherein each entry of the fourth array is indicative of the position of the respective entry of the third array within the downmix matrix in the scan order.

20. The apparatus according to claim 16, wherein each entry of the fourth array indicates the column of the downmix matrix in which the respective entry of the third array is located in the downmix matrix for a row-wise scan order, or the row of the downmix matrix in which the respective entry of the third array is located in the downmix matrix for a column-wise scan order.

21. The apparatus according to claim 18, further configured to:
determine a fifth array, the entries of which indicate the number of non-zero entries per respective row of the downmix matrix for a row-wise scan order or the number of non-zero entries per respective column of the downmix matrix for a column-wise scan order.

22. The apparatus according to claim 21, wherein applying the downmix matrix to the first array further involves, for the at least one frequency bin:
assigning sums of one or more products of the entries of the third array with the corresponding entries of the first array for the respective frequency bin to the entries of the second array on the basis of the entries of the fifth array.

23. The apparatus according to claim 20, wherein applying the downmix matrix to the first array further involves, for the at least one frequency bin:
successively incrementing the entry index to the third array by one at a time and determining, for each such entry index, a product of the entry of the third array indicated by the respective entry index with the corresponding entry of the first array for the respective frequency bin; and
sequentially assigning sums of one or more of these products to the entries of the second array, wherein the assignment is based on the entries of the fifth array.

24. The apparatus according to claim 23, wherein applying the downmix matrix to the first array further involves, for the at least one frequency bin:
for each entry index to the third array, determining, as a second product, a product of the square of the entry of the third array indicated by the respective entry index with the absolute square of the corresponding entry of the first array for the respective frequency bin; and
sequentially assigning sums of one or more of these second products to the entries of a sixth array for the respective frequency bin, wherein the assignment is based on the entries of the fifth array, and wherein a sum of the sixth arrays over frequency bins within a given processing band yield the indication of energy for the frequency bins within said given processing band.

25. The apparatus according to claim 24, wherein determining the frequency bins within the given processing band involves referring to a lookup table, wherein the lookup table comprises, for each processing band, an entry indicating the number of frequency bins within the respective processing band.

* * * * *